(12) United States Patent
Hornung et al.

(10) Patent No.: US 11,526,443 B2
(45) Date of Patent: Dec. 13, 2022

(54) READ-IF-HIT-PRE-POPA REQUEST

(71) Applicant: Arm Limited, Cambridge (GB)

(72) Inventors: Alexander Alfred Hornung, Cambridge (GB); Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/445,146

(22) Filed: Aug. 16, 2021

(65) Prior Publication Data

US 2022/0058121 A1 Feb. 24, 2022

(30) Foreign Application Priority Data

Aug. 20, 2020 (GB) ..................................... 2013026

(51) Int. Cl.
  *G06F 12/0802* (2016.01)
  *G06F 3/06* (2006.01)
(52) U.S. Cl.
  CPC ........ *G06F 12/0802* (2013.01); *G06F 3/0622* (2013.01); *G06F 3/0655* (2013.01); *G06F 3/0673* (2013.01); *G06F 2212/60* (2013.01)

(58) Field of Classification Search
  None
  See application file for complete search history.

(56) References Cited

U.S. PATENT DOCUMENTS 9,934,152 B1 * 4/2018 Bryant ................ G06F 12/0895
2006/0026385 A1 2/2006 Dinechin et al.

* cited by examiner

*Primary Examiner* — Charles J Choi
(74) *Attorney, Agent, or Firm* — Nixon & Vanderhye P.C.

(57) ABSTRACT

Requester circuitry 4 issues an access request specifying a target physical address (PA) and a target physical address space (PAS) identifier identifying a target PAS. Prior to a point of physical aliasing (PoPA), a pre-PoPA memory system component 24, 8 treats aliasing PAs from different PASs which actually correspond to the same memory system resource as if they correspond to different memory system resources. A post-PoPA memory system component 6 treats the aliasing PAs as referring to the same memory system resource. When the target PA and target PAS of a read-if-hit-pre-PoPA request hit in a pre-PoPA cache 24, a data response is returned to the requester circuitry 4. If the read-if-hit-pre-PoPA request misses in the pre-PoPA cache 24, a no-data response is returned. The read-if-hit-pre-PoPA request is safe to issue speculatively while waiting for security checks to be performed, improving performance.

19 Claims, 12 Drawing Sheets

READ-IF-HIT-PRE-POPA REQUEST

CROSS-REFERENCE TO RELATED APPLICATIONS

This application claims priority pursuant to 35 U.S.C. 119(a) to United Kingdom Patent Application No. 2013026.6, filed Aug. 20, 2020, which application is incorporated herein by reference in its entirety.

TECHNICAL FIELD

The present technique relates to the field of data processing.

BACKGROUND

A data processing system may have requester circuitry for issuing access requests for accessing a memory system, and one or more memory system components for responding to the access requests issued by the requester circuitry, to provide access to data stored in the memory system.

SUMMARY

At least some examples provide an apparatus comprising: requester circuitry to issue an access request for accessing a memory system, the access request specifying a target physical address and a target physical address space identifier identifying a target physical address space selected from among a plurality of physical address spaces; and memory system components to respond to the access request issued by the requester circuitry, the memory system components including: prior to a point of physical aliasing (PoPA), at least one pre-PoPA memory system component configured to treat aliasing physical addresses from different physical address spaces which actually correspond to the same memory system resource as if the aliasing physical addresses correspond to different memory system resources; and beyond the PoPA, at least one post-PoPA memory system component configured to treat the aliasing physical addresses as referring to the same memory system resource; in which: in response to a read-if-hit-pre-PoPA request issued by the requester circuitry specifying the target physical address and the target physical address space identifier, at least one of the memory system components is configured to provide a read-if-hit-pre-PoPA response action comprising: when the read-if-hit-pre-PoPA request hits in at least one pre-PoPA cache prior to the PoPA, providing a data response to the requester circuitry to return data cached in a hit entry of the at least one pre-PoPA cache corresponding to the target physical address and the target physical address space identifier; and when the read-if-hit-pre-PoPA request misses in the at least one pre-PoPA cache, providing a no-data response to the requester circuitry indicating that data for the target physical address will not be returned to the requester circuitry in response to the read-if-hit-pre-PoPA read request.

At least some examples provide a method comprising: issuing, from requesting circuitry, an access request for accessing a memory system comprising memory system components, the access request specifying a target physical address and a target physical address space identifier identifying a target physical address space selected from among a plurality of physical address spaces; and responding to the access request issued by the requester circuitry using the memory system components, the memory system components including: prior to a point of physical aliasing (PoPA), at least one pre-PoPA memory system component configured to treat aliasing physical addresses from different physical address spaces which actually correspond to the same memory system resource as if the aliasing physical addresses correspond to different memory system resources; and beyond the PoPA, at least one post-PoPA memory system component configured to treat the aliasing physical addresses as referring to the same memory system resource; in which: in response to a read-if-hit-pre-PoPA request issued by the requester circuitry specifying the target physical address and the target physical address space identifier, at least one of the memory system components provides a read-if-hit-pre-PoPA response action comprising: when the read-if-hit-pre-PoPA request hits in at least one pre-PoPA cache prior to the PoPA, providing a data response to the requester circuitry to return data cached in a hit entry of the at least one pre-PoPA cache corresponding to the target physical address and the target physical address space identifier; and when the read-if-hit-pre-PoPA request misses in the at least one pre-PoPA cache, providing a no-data response to the requester circuitry indicating that data for the target physical address will not be returned to the requester circuitry in response to the read-if-hit-pre-PoPA request.

At least some examples provide a memory system component comprising: a requester interface to receive an access request from requester circuitry, the access request specifying a target physical address and a target physical address space identifier identifying a target physical address space selected from among a plurality of physical address spaces; and control circuitry to detect whether a hit or miss is detected in a lookup of at least one pre-PoPA cache prior to a point of physical aliasing (PoPA), where the at least one pre-PoPA cache is configured to treat aliasing physical addresses from different physical address spaces which actually correspond to the same memory system resource as if the aliasing physical addresses correspond to different memory system resources, and the PoPA is a point beyond which at least one post-PoPA memory system component is configured to treat the aliasing physical addresses as referring to the same memory system resource; in which: in response to a read-if-hit-pre-PoPA request issued by the requester circuitry specifying the target physical address and the target physical address space identifier, the control circuitry is configured to provide a read-if-hit-pre-PoPA response action comprising: when the lookup of the at least one pre-PoPA cache detects a hit, controlling the requester interface to provide a data response to the requester circuitry to return data cached in a hit entry of the at least one pre-PoPA cache corresponding to the target physical address and the target physical address space identifier; and when the lookup of the at least one pre-PoPA cache detects a miss, controlling the requester interface to provide a no-data response to the requester circuitry indicating that data for the target physical address will not be returned to the requester circuitry in response to the read-if-hit-pre-PoPA request.

BRIEF DESCRIPTION OF THE DRMMINGS

Further aspects, features and advantages of the present technique will be apparent from the following description of examples, which is to be read in conjunction with the accompanying drawings, in which.

Figure 4:
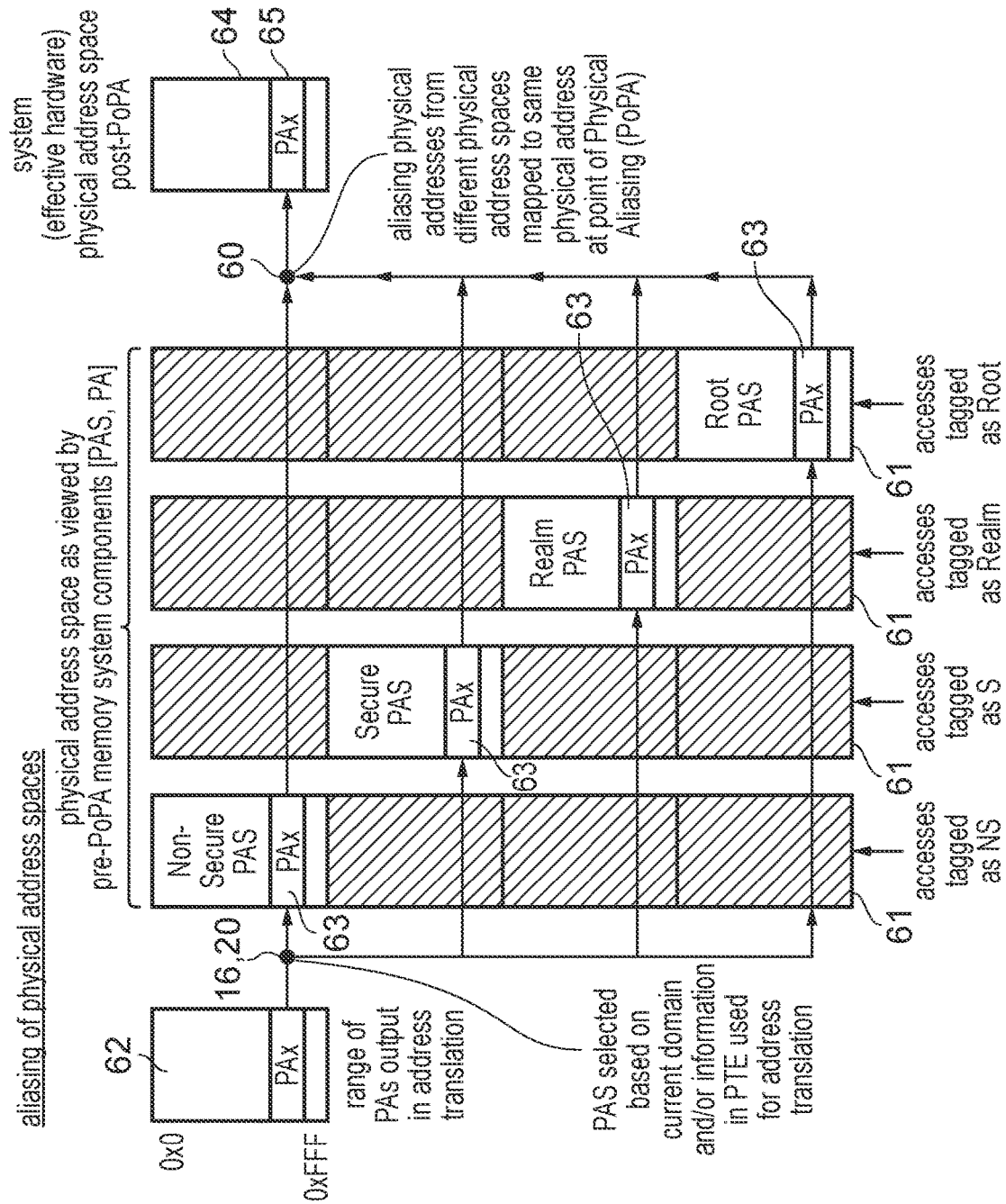
Figure 5:
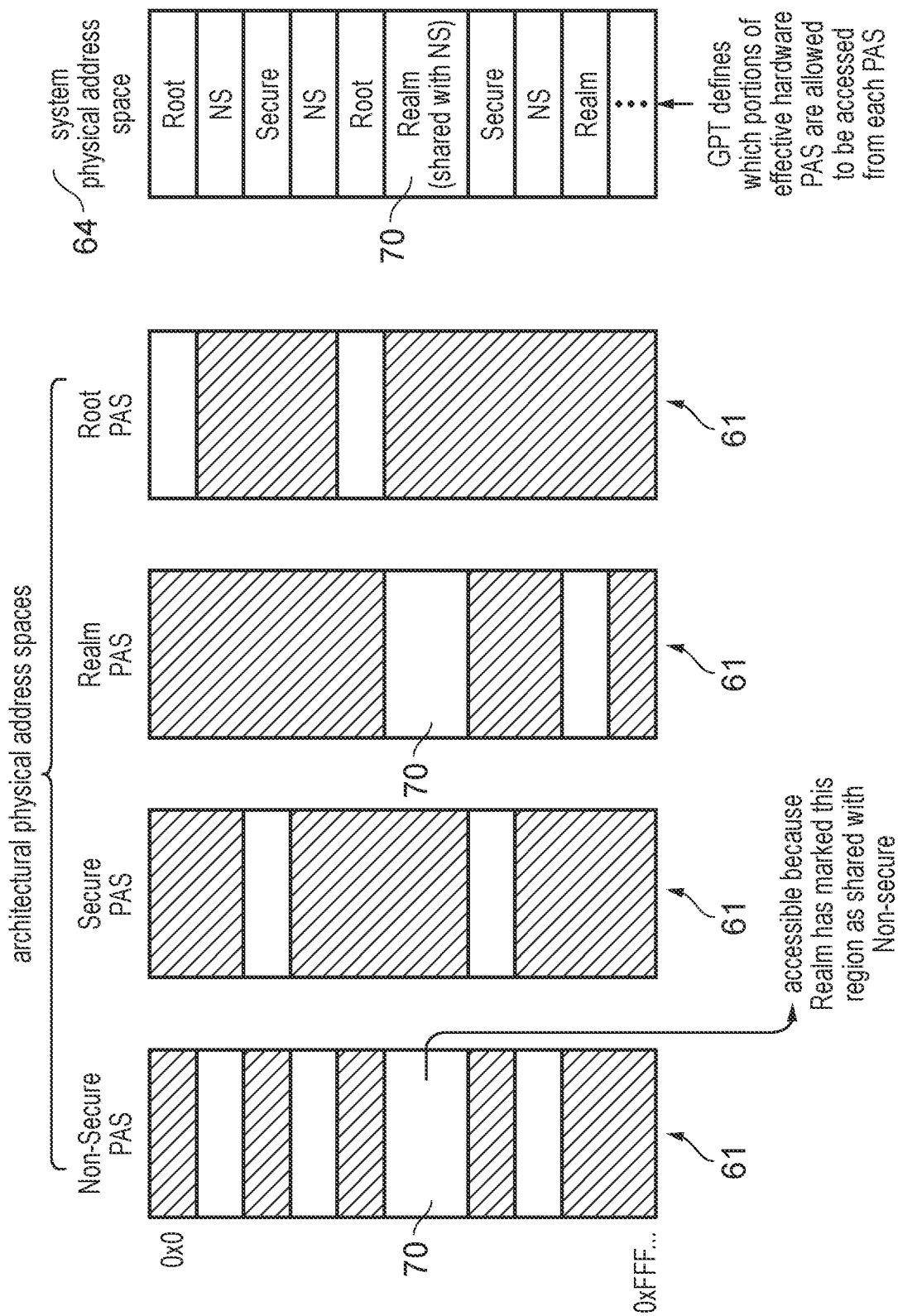
Figure 6:
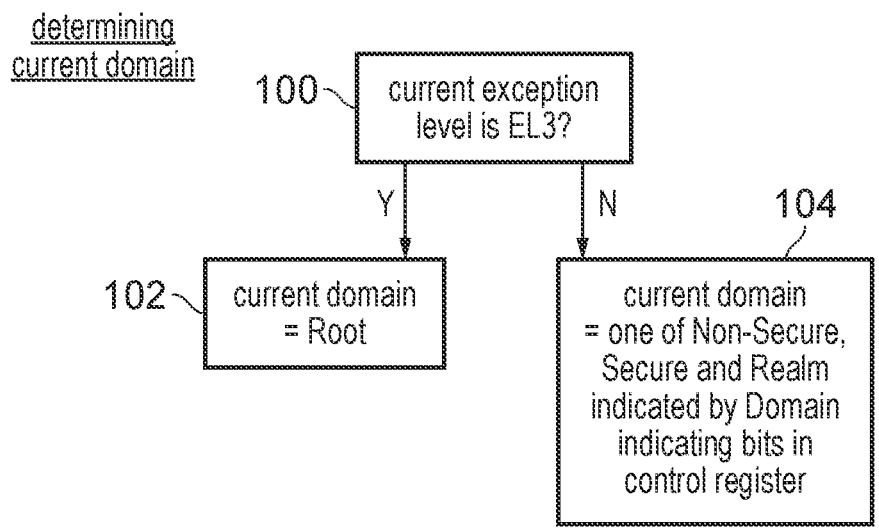
Figure 7:
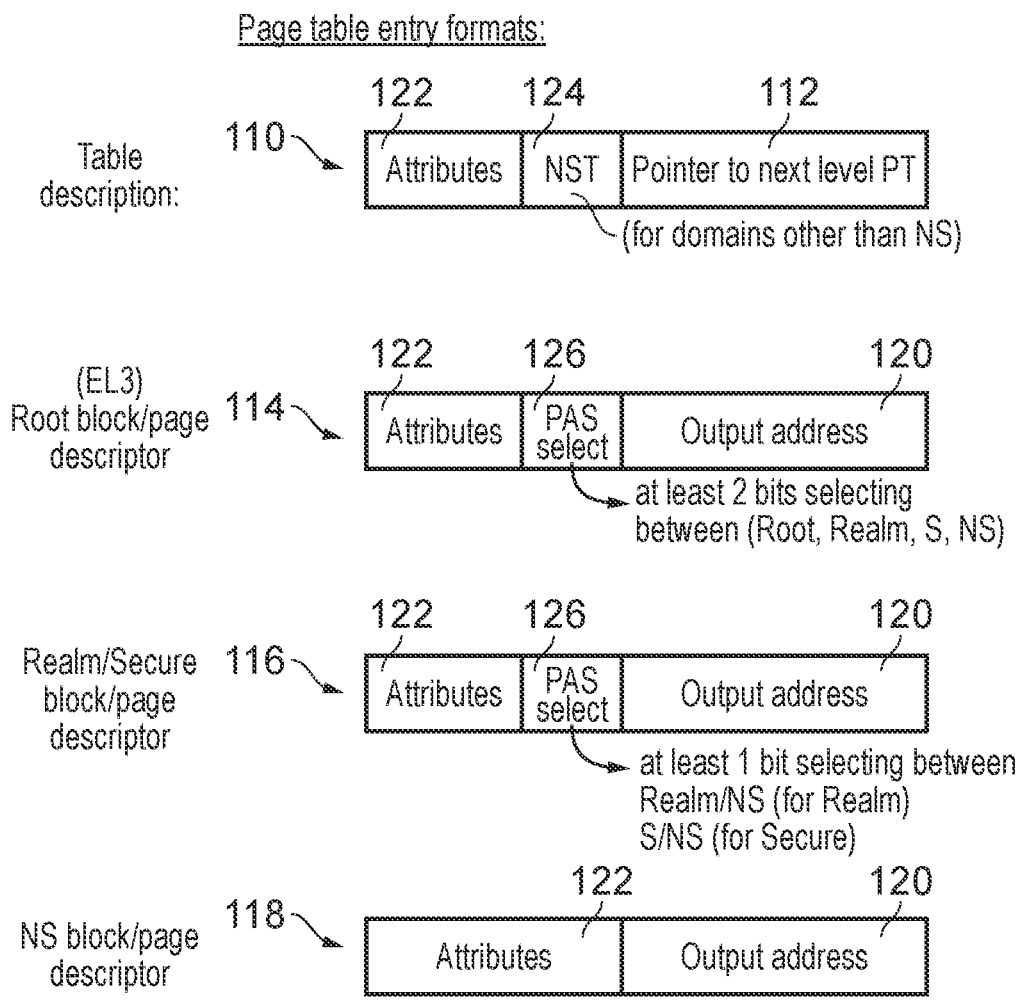
Figure 8:
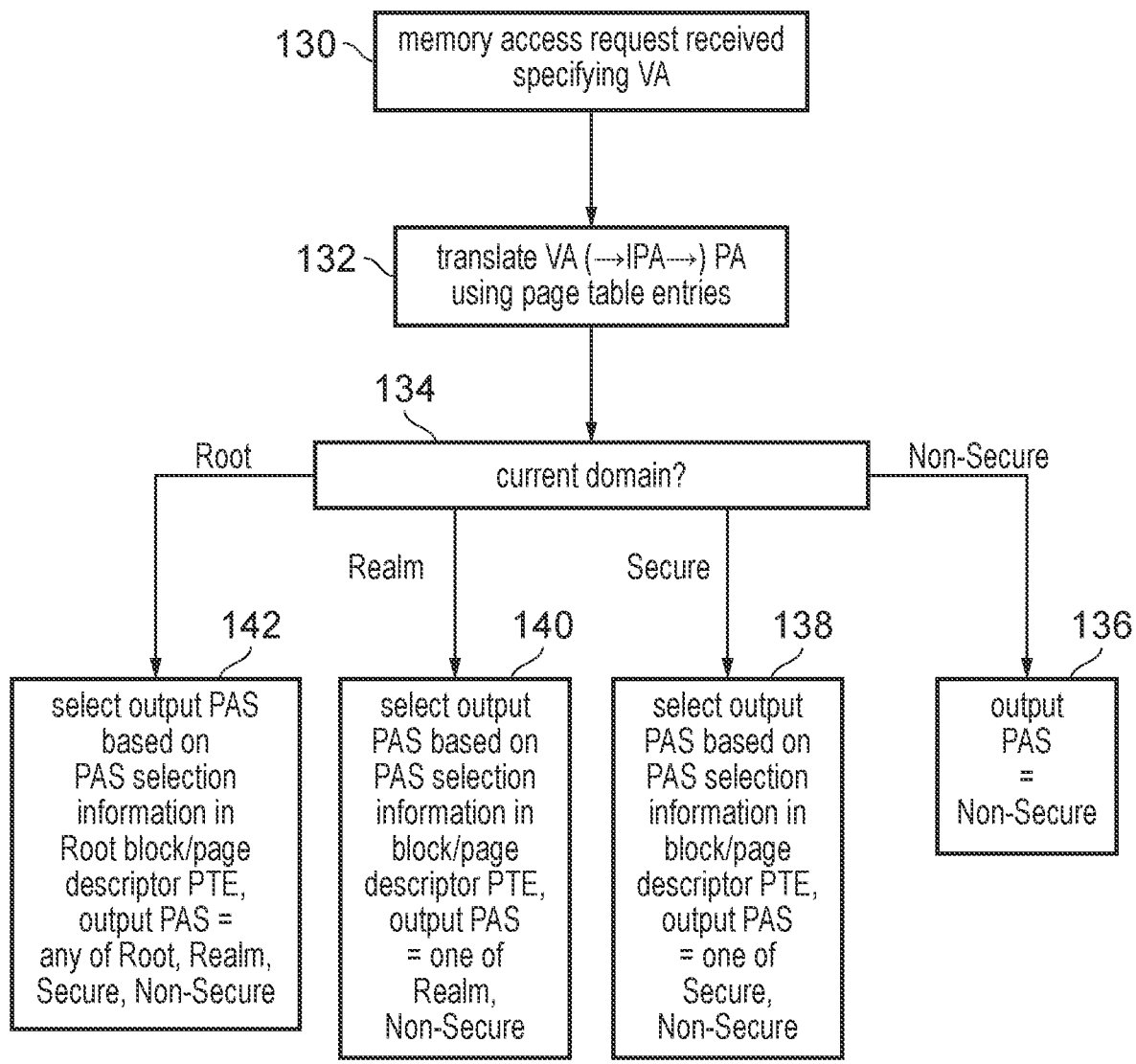
Figure 9:
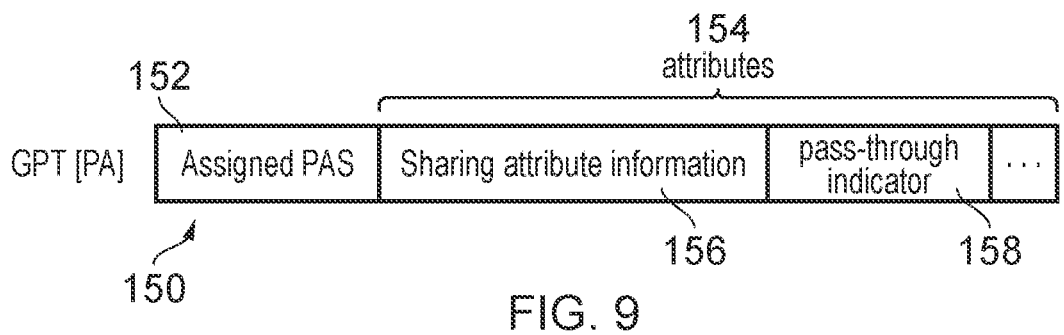
Figure 10:
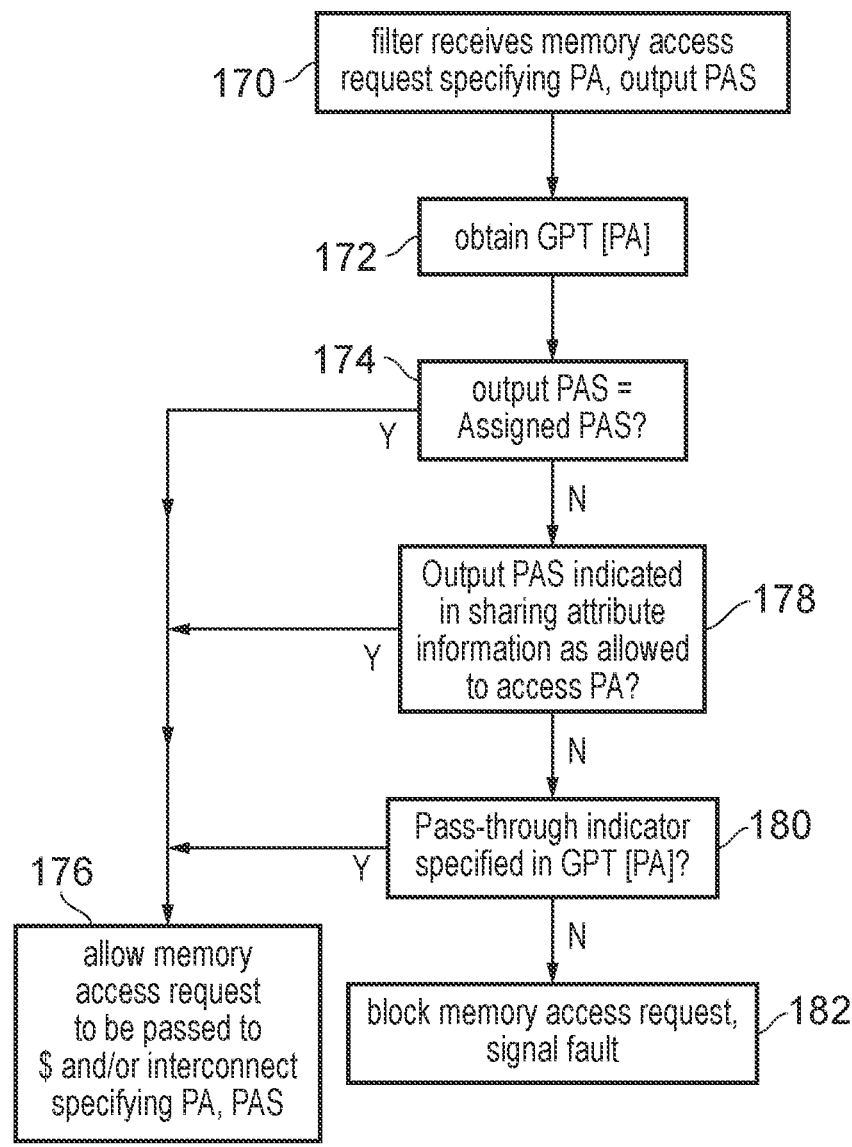
Figure 11:
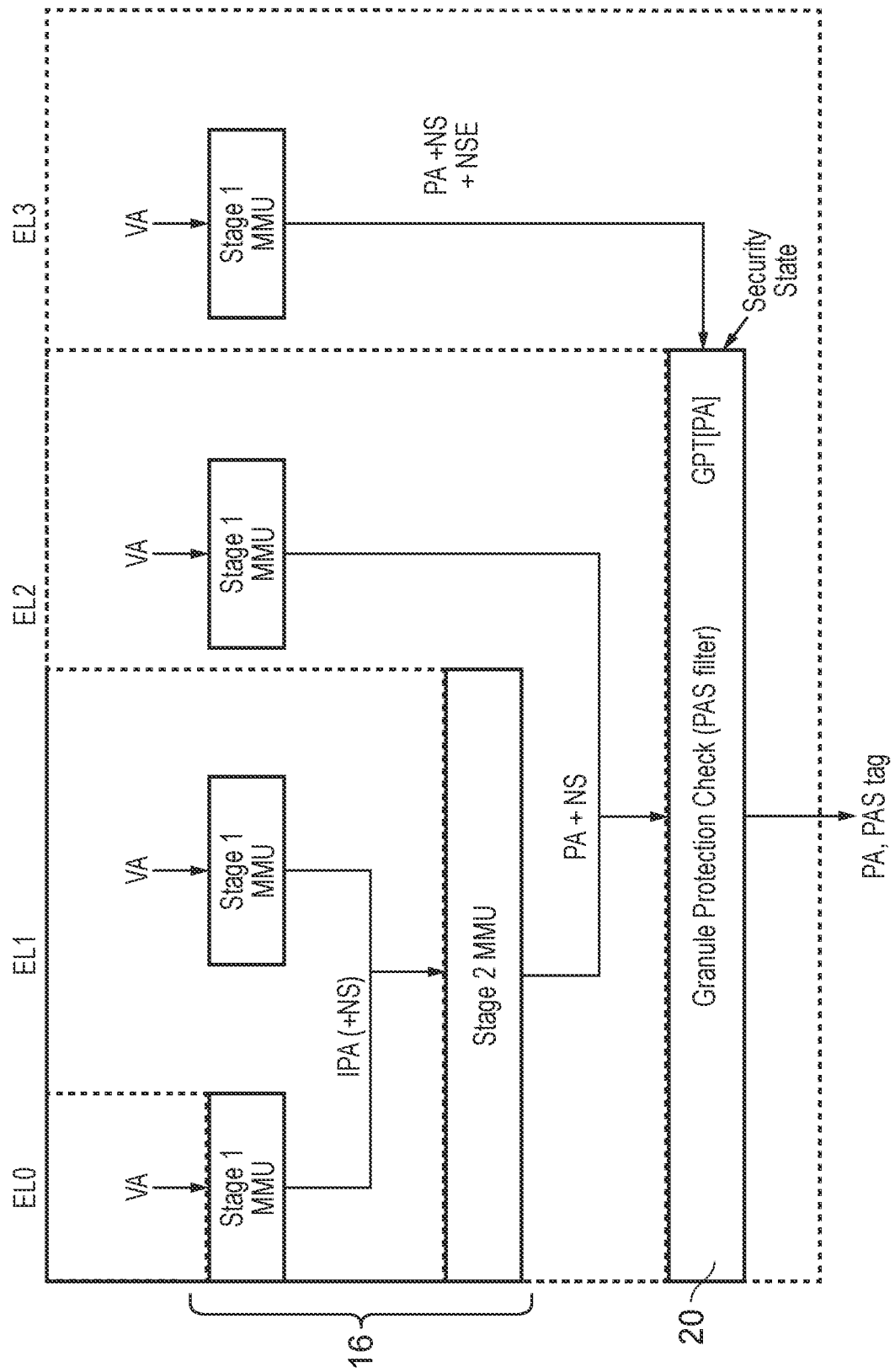
Figure 12:
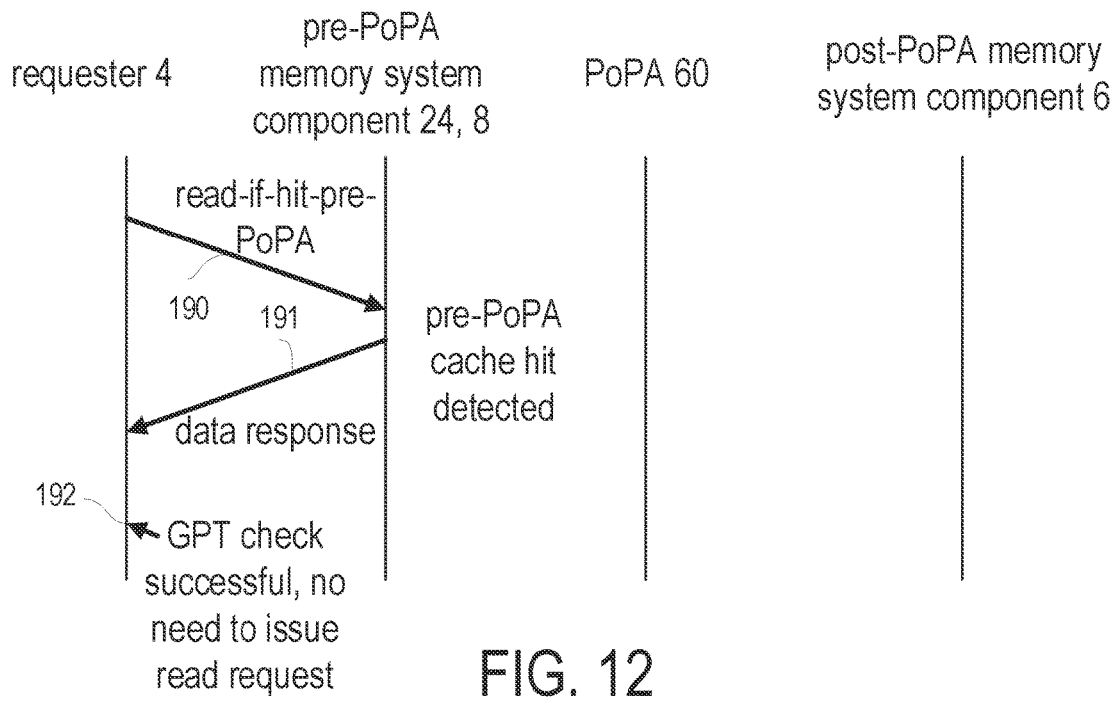
Figure 13:
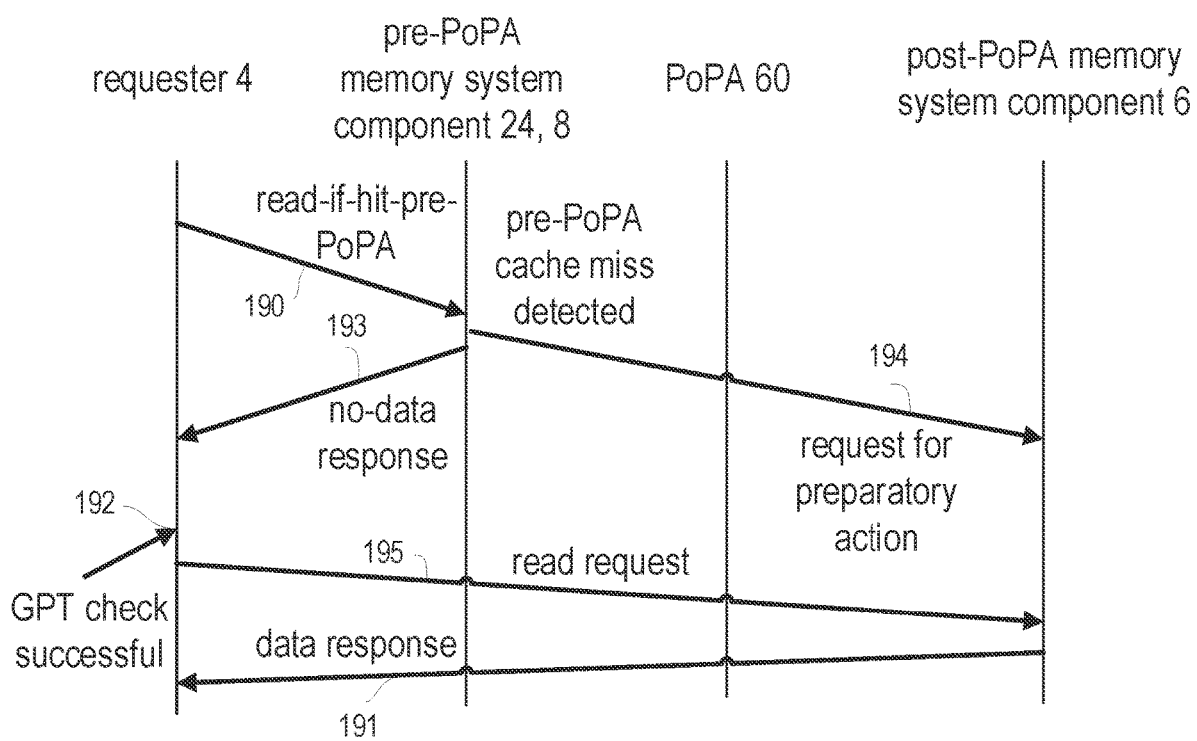
Figure 14:
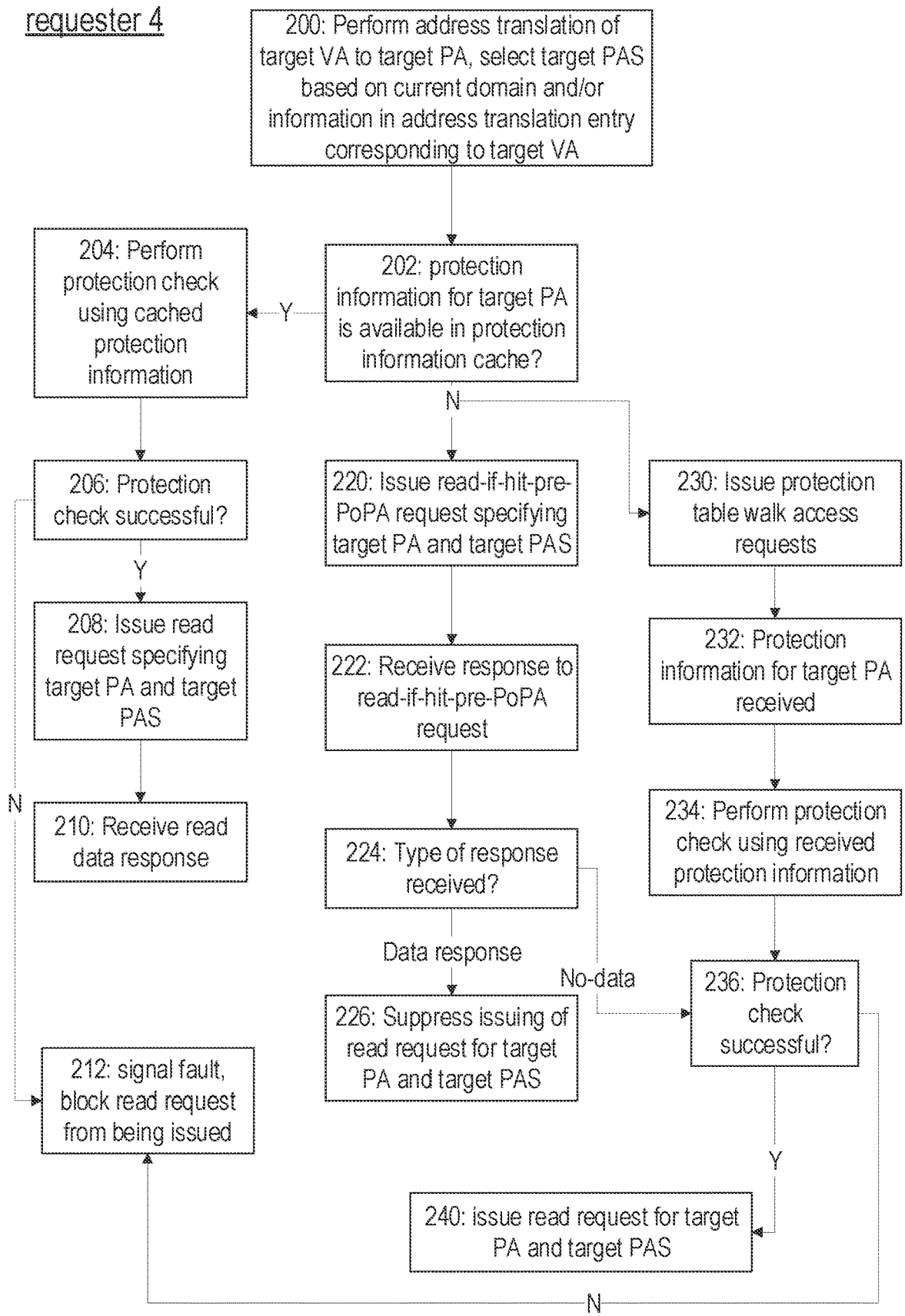
Figure 15:
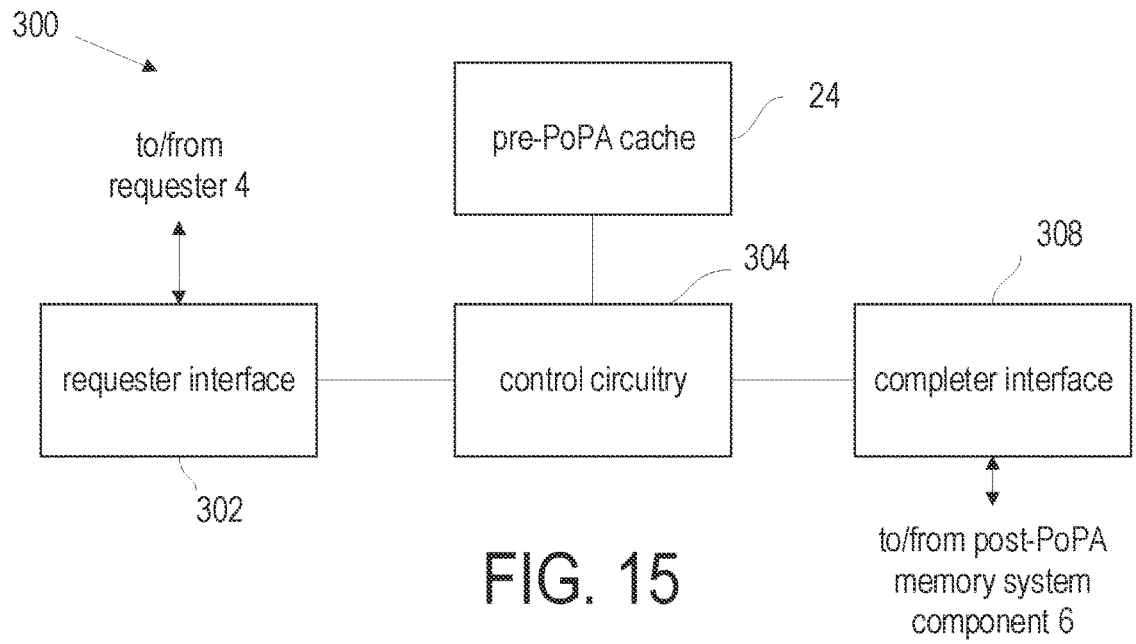

FIG. 4 schematically illustrates aliasing of a number of physical address spaces onto a system physical address space identifying locations in the memory system;

FIG. 5 illustrates an example of partitioning the effective hardware physical address space so that different architectural physical address spaces have access to respective portions of the system physical address space;

FIG. 6 is a flow diagram illustrating a method of determining the current domain of operation of the processing circuitry;

FIG. 7 shows examples of page table entry formats for page table entries used for translating virtual addresses to physical addresses;

FIG. 8 is a flow diagram showing a method of selecting a physical address space to be accessed by a given memory access request;

FIG. 9 illustrates an example of an entry of a granule protection table for providing granule protection information indicating which physical address spaces are allowed to access a given physical address;

FIG. 10 is a flow diagram showing a method of performing a granule protection lookup;

FIG. 11 illustrates a number of stages of address translation and granule protection information filtering;

FIGS. 12 and 13 illustrate a response to a read-if-hit-pre-PoPA request;

FIG. 14 is a flow diagram showing a requester initiating an access to a target physical address in a target physical address space, including use of the read-if-hit-pre-PoPA request;

FIG. 15 illustrates an example of a pre-PoPA memory system component; and

Figure 16:
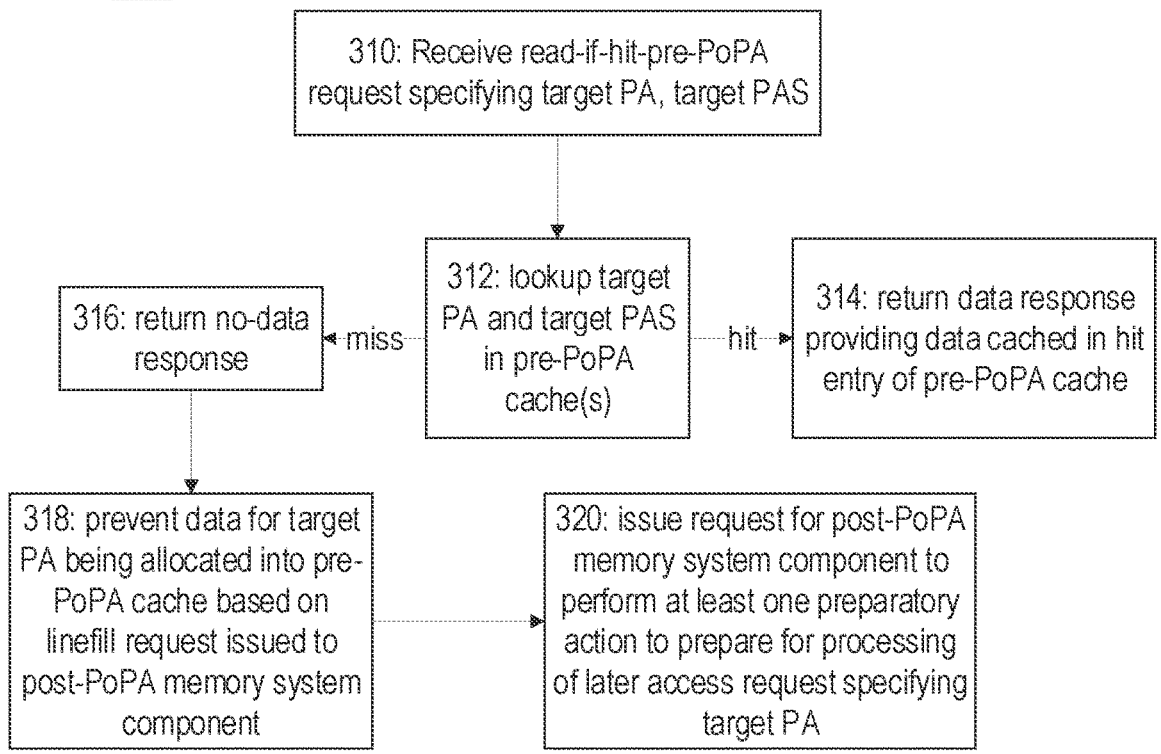

FIG. 16 is a flow diagram illustrating a method of responding to a read-if-hit-pre-PoPA request using the pre-PoPA memory system component.

DETAILED DESCRIPTION

Data processing systems may support use of virtual memory, where address translation circuitry is provided to translate a virtual address (VA) specified by a memory access request into a physical address (PA) associated with a location in a memory system to be accessed. The mappings between virtual addresses and physical addresses may be defined in one or more page table structures. The page table entries within the page table structures could also define some access permission information which may control whether a given software process executing on the processing circuitry is allowed to access a particular virtual address.

In some processing systems, all virtual addresses may be mapped by the address translation circuitry onto a single physical address space which is used by the memory system to identify locations in memory to be accessed. In such a system, control over whether a particular software process can access a particular address is provided solely based on the page table structures used to provide the virtual-to-physical address translation mappings. However, such page table structures may typically be defined by an operating system and/or a hypervisor. If the operating system or the hypervisor is compromised then this may cause a security leak where sensitive information may become accessible to an attacker.

Therefore, for some systems where there is a need for certain processes to execute securely in isolation from other processes, the system may support a number of distinct physical address spaces, where for at least some components of the memory system, memory access requests whose virtual addresses are translated into physical addresses in different physical address spaces are treated as if they were accessing completely separate addresses in memory, even if the physical addresses in the respective physical address spaces actually correspond to the same location in memory. By isolating accesses from different domains of operation of the processing circuitry into respective distinct physical address spaces as viewed for some memory system components, this can provide a stronger security guarantee which does not rely on the page table permission information set by an operating system or hypervisor.

Hence, an apparatus may have requester circuitry for issuing an access request for accessing a memory system where the access request specifies a target physical address (target PA) and a target physical address space identifier identifying a target physical address space (target PAS) selected from among two or more different physical address spaces (PASs). Note that the notation "PAS" (with S in capitals) used below refers to "physical address space", while the notation "PAs" (with s in lower case) refers to "physical addresses" (the plural of PA).

Memory system components may be provided to respond to the access request issued by the requester circuitry. The memory system components include: prior to a point of physical aliasing (PoPA), at least one pre-PoPA memory system component which treats aliasing PAs from different PASs which actually correspond to the same memory system resource as if the aliasing PAs correspond to different memory system resources, and beyond the PoPA, and at least one post-PoPA memory system component configured to treat the aliasing PAs as referring to the same memory system resource. Here, a "memory system resource" may refer to an addressable location in memory, a device or peripheral mapped to a certain memory address in the PAS, a memory mapped register within a memory system component, or any other resource which is accessed by issuing a memory access request specifying a physical address mapped to that resource.

By treating aliasing PAs from different PASs which actually correspond to the same memory system resource as if they correspond to different memory system resources (in memory system components prior to the PoPA), then this can provide a stronger security guarantee as mentioned above. For example, when the pre-PoPA memory system components include a pre-PoPA cache, a request specifying a given PA and a first PAS may not hit against an entry caching data associated with the same given PA for a second PAS, so that data for the second PAS can be prevented from being returned to a software process operating using the first PAS even if the page tables do not prevent such the software process operating using the first PAS from accessing the given PA.

A protocol may be established defining the format of access requests which can be issued by the requester circuitry (or by an upstream memory system component to a downstream memory system component) to control access to memory, and defining corresponding responses taken by memory system components in response to the access requests. For example, the protocol could define various types of read request to read data from the memory system and write requests to write data stored in the memory system.

In the examples discussed further below, the requester circuitry supports issuing of a read-if-hit-pre-PoPA request which specifies the target PA and the target PAS identifier. In response to the read-if-hit-pre-PoPA request, at least one of the memory system components provides a read-if-hit-pre-PoPA response action which comprises: when the read-if-hit-pre-PoPA request hits in at least one pre-PoPA cache prior to the PoPA, providing a data response to the requester circuitry to return data cached in a hit entry of the at least one pre-PoPA cache corresponding to the target physical address and the target PAS identifier; and when the read-if-hit-pre-PoPA request misses in the at least one pre-PoPA cache, providing a no-data response to the requester circuitry indicating that data for the target physical address will not be returned to the requester circuitry in response to the read-if-hit-pre-PoPA read request.

Hence, the read-if-hit-pre-PoPA request allows the requester circuitry to make a conditional request for data to be returned from the memory system in the case when the request hits in a cache prior to the PoPA, but with no data being returned if the request misses in any pre-PoPA cache. Such a read-if-hit-pre-PoPA request is useful for improving performance because it is able to be issued speculatively before any checks for determining whether a given physical address is allowed to be accessed within a given PAS have been completed. Data already cached in the at least one pre-PoPA cache for a given target PA and target PAS identifier may be assumed to already have passed such checks and so can safely be accessed before such checks are complete, but if the read-if-hit-pre-PoPA request misses in any pre-PoPA cache then it cannot be guaranteed that the target PA is allowed to be accessed within the target PAS and so a no-data response may be returned. In contrast, with conventional read requests the data would be returned to the requester regardless of whether it hits or misses in the pre-PoPA cache, since if the request misses in the pre-PoPA cache then one would normally expect a linefill operation to be initiated to request that the data is brought into the pre-PoPA cache from memory and returned to the requester. However, by defining a type of request which returns a no-data response if the request misses in the at least one pre-PoPA cache, then this allows a request to be issued while speculating on the outcome of any security check on the target physical address and target PAS being successful, to allow performance to be improved.

Issuing of the read-if-hit-pre-PoPA request while speculating on a security check being successful may be one use case for the read-if-hit-pre-PoPA request. However, once the read-if-hit-pre-PoPA is included in a memory interface protocol to be made available to requester circuitry, system designers may find other use cases where this request may be useful. The protocol may not constrain the exact scenarios in which the read-if-hit-pre-PoPA request is to be used. Hence, it is possible that the read-if-hit-pre-PoPA request may be used in other scenarios, not just while waiting for security checks to complete to check whether the target PA can be accessed within the target PAS.

When the read-if-hit-pre-PoPA request misses in the at least one pre-PoPA cache, data for the target physical address may be prevented from being allocated in the at least one pre-PoPA cache based on the linefill request issued to at least one post-PoPA memory system component in response to the read-if-hit-pre-PoPA read request. Hence, while the read-if-hit-pre-PoPA request is allowed to return data if it hits in the at least one pre-PoPA cache (so the required data is already cached pre-PoPA), if there is a miss then it is not allowed for data to be brought into the pre-PoPA cache from a memory system component beyond the PoPA. Likewise, for types of access request other than the read-if-hit-pre-PoPA request, a pre-PoPA memory system component may be prohibited from allocating data into a pre-PoPA cache based on a linefill request to a post-PoPA memory system component until a security check for checking whether the target physical address may safely be accessed within the target PAS has been completed successfully. With this approach, it can be ensured that data in a hit entry of the pre-PoPA cache can safely be accessed by a read-if-hit-pre-PoPA request even if that request has been issued prior to completing a security check, as the presence of the data in the pre-PoPA cache may be an indication that a previous security check for the target PA and target PAS was successful.

There may be different options for implementing the functionality where data for a target physical address is prevented from being allocated into a pre-PoPA cache when the read-if-hit-pre-PoPA request misses. In one example the pre-PoPA memory system component processing the read-if-hit-pre-PoPA request may simply prevent a linefill request being issued to a post-PoPA memory system component in response to the read-if-hit-pre-PoPA read request when a miss occurs in the at least one pre-PoPA cache. Alternatively, some implementations may provide a buffer associated with a pre-PoPA memory system component which may buffer data returned in response to linefill requests issued in response to the read-if-hit-pre-PoPA request on a miss. This buffer may not be accessible to subsequent requests until a confirmation has been received that the security check for the target physical address and target PAS identifier has successfully been completed. Hence, there are a number of micro-architectural options for ensuring that data for a target physical address is not allocated into the pre-PoPA cache when the read-if-hit-pre-PoPA request misses in the pre-PoPA cache. With the buffer option this could allow subsequent requests after a security check has been completed to be carried out more quickly than if the linefill requests could only be issued at that point, but the buffer approach may be more complex to implement. Both options are possible.

In some examples, there may be two or more levels of pre-PoPA cache prior to the point of physical aliasing. In this case, the read-if-hit-pre-PoPA request may be considered to hit in a pre-PoPA cache if any of the two or more levels of pre-PoPA cache include a valid entry which corresponds to the target PA and targets PAS identifier. In contrast, a miss may be detected if none of the two or more levels of pre-PoPA cache includes a valid entry corresponding to the target PA and target PAS identifier. Note that in the case where the read-if-hit-pre-PoPA request hits in one of the pre-PoPA cache levels, then it is possible for there to be some transfer of data between the respective levels of pre-PoPA cache, as a hit in pre-PoPA cache further down the hierarchy (e.g. level 2 or 3) could cause the data to be promoted into a pre-PoPA cache higher up the hierarchy (e.g. level 1 or 2) which can be accessed faster by the requester circuitry, and this promotion of data for the target PA could also trigger other addresses to have their data demoted to a cache further down the hierarchy. Hence, while the read-if-hit-pre-PoPA request is not allowed to cause data to be promoted from a location beyond the PoPA to a pre-PoPA cache, it does not rule out movement of data between various levels of pre-PoPA cache.

In some implementations, the only response action taken for the read-if-hit-pre-PoPA request in the miss scenario could be returning the no-data response.

However, for some examples, as well as returning the no-data response, when the read-if-hit-pre-PoPA request misses in the at least one pre-PoPA cache, the read-if-hit-pre-PoPA response action may also comprise issuing a request for at least one of one or more post-PoPA memory system components to perform at least one preparatory operation to prepare for processing of a later access request specifying a target PA. This recognises that, in the case when the read-if-hit-pre-PoPA request misses in the at least one pre-PoPA cache, then although the corresponding data for the target PA cannot yet be safely returned, it is relatively likely that a subsequent request will be made to the same target PA once any security checks have completed (since successful security checks would be expected to be much more common than unsuccessful security checks). Therefore, by performing a preparatory operation in response to the read-if-hit-pre-PoPA request in the case where the request misses in the pre-PoPA cache or caches, this could speed up handling of a later access request specifying the target PA because part of the operation required to access data associated with the target PA from a post-PoPA memory system component may already have been performed at the time of handling the read-if-hit-pre-PoPA request.

The preparatory operation may comprise any operation which may be predicted to cause a subsequent access request specifying the same target PA to be processed faster than if the preparatory operation has not been performed.

For example, in some implementations the at least one preparatory operation may comprise prefetching data associated with a target PA into a post-PoPA cache. Unlike the pre-PoPA cache which will treat aliasing PAs from different PASs as if they refer to different memory system sources even if they actually correspond to the same memory system resource, a post-PoPA cache treats the aliasing PAs as referring to the same memory system resource. As data would not be brought into a pre-PoPA cache from the post-PoPA cache unless a relevant security check is completed, and the post-PoPA may cache data for a given PA in the same way regardless of which PAS that given PA may be accessed from, then it may be safe to prefetch data into a post-PoPA cache in response to the read-if-hit-pre-PoPA request in the case where the request misses in the pre-PoPA cache. By performing the prefetching operation, this means that when a subsequent read request is issued to the same target PA, the data can be returned faster from the post-PoPA cache than if the data had to be obtained from main memory. This helps to improve performance.

Another example of the preparatory operation may be performing a pre-charge or activation operation to prepare a memory location associated with a target PA for access. Some forms of memory technology, such as dynamic random access memory (DRAM) require a row of memory locations to be pre-charged or activated before they can be read, and this pre-charge or activation operation takes a certain amount of time to perform. By speculatively performing the pre-charge or activation operation as a response to the read-if-hit-pre-PoPA request in the case of a miss in the pre-PoPA cache, this means that when a subsequent access request tries to access the same target PA it is less likely that the pre-charge or activation operation needs to be performed again and so the memory location associated with the target PA can be accessed faster than if the pre-charge or activation operation had not been performed.

These two examples of preparatory operations (prefetching or performing pre-charge or activation operations) could be implemented within the same system, so that both the prefetch request and the pre-charge or activation operation are initiated when the read-if-hit-pre-PoPA request misses in the pre-PoPA cache. Alternatively, some systems may not support both of these operations. For example, a system which does not have any post-PoPA cache may perform only the pre-charge or activation operation as the preparatory operation. It will be appreciated that other types of preparatory operation could also be performed.

Also, the preparatory operation may not be essential and some implementations may choose not to initiate any preparatory operation in the case where the read-if-hit-pre-PoPA request misses.

Protection checking circuitry may be provided to perform a protection check to determine whether the target PA for a given access request is allowed to be accessed within the target PAS, based on a lookup of protection information corresponding to the target PA. The protection information may indicate at least one allowed PAS from which the target PA is allowed to be accessed. There may be a number of ways of indicating which of the PASs is an allowed PAS. For example, some implementations may support protection information which identifies only a single PAS from which the target PA is allowed to be accessed, while other approaches may support multiple PASs being mapped to the same target PA so that the target PA may be allowed to be accessed from any one of those multiple PASs. The particular format of the protection information may vary considerably, but in general the protection information may be any information used to determine whether a memory access request specifying a PA in a selected PAS is allowed to access the corresponding data.

The protection checking circuitry may be requester-side checking circuitry which is provided to perform the protection checks prior to issuing a corresponding request to a cache or other memory system component (at least for some types of request—as mentioned above the read-if-hit-pre-PoPA request may be an exception in that it does not need to wait for the protection check to be completed).

In some examples, the protection information used for the protection check may be derived from a protection table stored in memory. This may allow more fine-grained control over which portions of a physical address range are accessible in each PAS, compared to an implementation where the protection information is stored within registers local to the protection checking circuitry. However, when the protection information could be stored within the memory system then this may mean that when a protection check needs to be performed for a target PA then the protection checking circuitry may issue one or more protection table walk access requests to the memory system components to perform a protection table walk to obtain the protection information from a protection table indexed by the target PA.

For example the protection table could be a multi-level protection table, where information derived from one level of protection table may be used to identify the location of a subsequent level of protection table. Such a multi-level table can help to allow the protection table to be represented using a number of smaller discontiguous portions of memory, avoiding the need to allocate a single contiguous block of address space for the table of size proportional to the address range to be protected, which would be needed if a single linearly accessed table was used. Especially in the multi-level case, such protection table walks can be relatively slow since they may require a chain of successive accesses to memory where later accesses in the chain are dependent on the values returned from earlier accesses. Nevertheless, even with a single-level table, an access to memory to obtain the protection information still incurs some additional latency after the target PA of a memory access is established.

Although it is possible to provide a protection information cache so that recently accessed information from the protection table can be accessed locally by the protection checking circuitry faster than accessing memory, if the protection information for the target PA is not already available in such a protection information cache (either because no such protection information cache is provided at all, or because a request to the protection information cache for the target PA misses) then one or more protection table walk access requests may be needed. If a protection information cache is provided, this could be a dedicated caching structure dedicated to storing protection information from the protection table, or could be a shared caching structure which could be shared with other types of data, such as a combined translation lookaside buffer (TLB)/protection information cache which caches both the protection information and address translation information used to translate VAs to PAs.

Hence, protection checks may be relatively slow operations as they may rely on fetching of protection information from memory. If a read request could not be safely issued to the memory system until after the protection check is complete then this may incur extra delay in accessing memory between the PA of a memory access becoming available following any address translation and the actual read request sent to the memory system components being issued.

The read-if-hit-pre-PoPA request described above can address this problem because the requester circuitry can issue the read-if-hit-pre-PoPA request prior to completing the protection check for the target PA and the target PAS.

In response to the protection check determining that the target physical address is allowed to be accessed within the target PAS when the no-data response was received in response to the read-if-hit-pre-PoPA request, then the requester circuitry may issue a read Crequest specifying the same target PA and target PAS as the earlier read-if-hit-pre-PoPA request. In response to the read request, at least one of the memory system components may provide a data response to return data associated with the target PA to the requester circuitry (even when the read request misses in the at least one pre-PoPA cache). In response to this read request, as the protection check has already been carried out successfully, then the memory system components are allowed to cause data associated with the target PA to be allocated into the at least one pre-PoPA cache based on a linefill request issued to at least one of the at least one post-PoPA memory system component.

The read request described above which is issued following a successful protection check may be a type of read request which is prohibited from being issued by the requester circuitry when the protection check determines that the target physical address is not allowed to be accessed within the target PAS. The requester circuitry may not be allowed to issue this type of read request until the protection check has been completed to determine that the target PA is allowed to be accessed within the target PAS.

The protection circuitry may signal a fault when the protection check determines that the target physical address is not allowed to be accessed within the target PAS. The fault may trigger an exception handler to be executed, where the exception handler may determine (in software) how to deal with the fault.

The at least one pre-PoPA cache may, as described, treat aliasing PAs addresses as if they correspond to the different memory system resources even if they actually correspond to the same memory system resource. In one example, this can be implemented by tagging each cache entry in the at least pre-PoPA cache with a corresponding PAS identifier. When the pre-PoPA cache is looked up for an access request specifying the target PA and target PAS, a target PA address tag derived from the target PA may be compared with an address tag stored in one or more looked up cache entries, and the target PAS of the access request may be compared with the PAS tag stored in the one or more looked up cache entries. A cache hit may be detected when a valid entry of the looked up cache entries has both the stored address tag and the stored PAS tag corresponding to the target PA address tag and target PAS identifier. A cache miss may be detected when no valid entry of the at least one pre-PoPA cache corresponds to both target PA and the target PAS identifier of an access request, even if there is a valid entry of the at least one pre-PoPA cache which corresponds to the target PA but corresponds to a different PAS identifier to the target PAS identifier (that is, an entry where the stored address tag corresponds to the target PA address tag, but which has a stored PAS tag not corresponding to the target PA address tag, will return a cache miss). Hence, it is possible that, at a given moment in time, a given pre-PoPA could hold separate valid cache entries corresponding to the same PA but different PASs. This approach ensures that data from one PAS cannot be returned in response to a request specifying a different PAS. This can be useful for isolating the data used by different software processes to ensure that sensitive data associated with one software process is not made accessible to another software process which is not allowed to gain access to the data, while not relying on page table access permissions set by an operating system or hypervisor to enforce the separation. In a majority of use cases a PA used for sensitive data may be allocated only to a single PAS. In some implementations some limited sharing of data from a different PAS could be supported where a given physical address may be mapped to two or more different PASs, and in that case it is possible that a pre-PoPA cache could simultaneously be caching multiple entries corresponding to the same target physical address but with different PAS identifiers.

The apparatus may comprise address translation circuitry to obtain the target physical address for a given access request by translating a target virtual address (VA), based on address translation information corresponding to the target VA. This could be a single stage of address translation direct from the target VA to the target PA, or could be a two-stage address translation based on first translation information mapping the target VA to a target intermediate address and second address translation information mapping the target intermediate address to the target PA. The address translation circuitry may also perform an access permission check based on permissions set in the address translation information. The protection check described above may be an additional layer of checking provided in addition to the access permission check performed by the address translation circuitry.

The apparatus may have PAS selection circuitry to select the target PAS identifier corresponding to the target PA based on at least one of: a current domain of operation of the requester circuitry, and information specified in the address translation information corresponding to the target virtual address. The PAS selection circuitry could in some cases be the address translation circuitry itself, or could be the protection checking circuitry described earlier which performs the protection check based on the protection information for the target physical address, or could be an entirely separate piece of circuitry to select which PAS is the target PAS. In some implementations multiple domains of operation may be supported for the requester circuitry, which could support executing different software processes in different domains. The selection of the target PAS may depend on the current domain so that certain domains may be restricted to only accessing a PAS selected from a limited subset of PASs. In some domains (e.g. the root domain described later on), the selected PAS may be any of the PASs. In some cases at least one domain of operation may be allowed to select two or more different PAS identifiers as the target PAS identifier, and in this case selection of the target PAS identifier could depend on information defined in the address translation information corresponding to the target virtual address. This approach provides an architecture which may provide flexibility to support different software use cases in situations where some security guarantees are required for different processes executing on a same hardware platform.

The requester circuitry mentioned above can be any component of a data processing system which may act as a source of access requests issued to request access to a memory system resource. For example, the requester circuitry may be a processor core capable of executing program instructions, such as a central processing unit (CPU) or graphics processing unit (GPU), or could be another type of master device in a data processing system which may not necessarily be capable of executing program instructions, but may act as a source of requests to memory (e.g. a display controller, network controller, or direct memory access (DMA) unit). Also, in some cases an internal memory system component may be able to initiate (or forward) request. For example an interconnect or cache controller may be able to generate access requests, and could sometimes act as the requester circuitry for a given memory access. Hence, the read-if-hit-pre-PoPA request could be issued by any such example requester circuitry. In one example, if a level 1 cache prior to the PoPA receives a read-if-hit-pre-PoPA request from a processor core, and a miss is detected, a linefill request issued to a level 2 cache also prior to the PoPA may itself be specified as a read-if-hit-pre-PoPA request to ensure that if the request misses in the level 2 cache then the level 2 cache will not pull in the data from a post-PoPA memory system component.

A memory system component may be provided which comprises a requester interface to receive an access request from requester circuitry and control circuitry to detect whether a hit or miss is detected for the access request in a lookup of at least one pre-PoPA cache prior to the point of physical aliasing. When the access request is a read-if-hit-pre-PoPA request as discussed above, the control circuitry may provide a read-if-hit-pre-PoPA response action (with a data response when the request hits in the pre-PoPA cache and a no-data response on a miss as explained earlier). Such a memory system component can be useful to include at a point prior to the PoPA within a processing system, to provide support for handling the read-if-hit-pre-PoPA request as described earlier.

DESCRIPTION OF EXAMPLES

Figure 1:
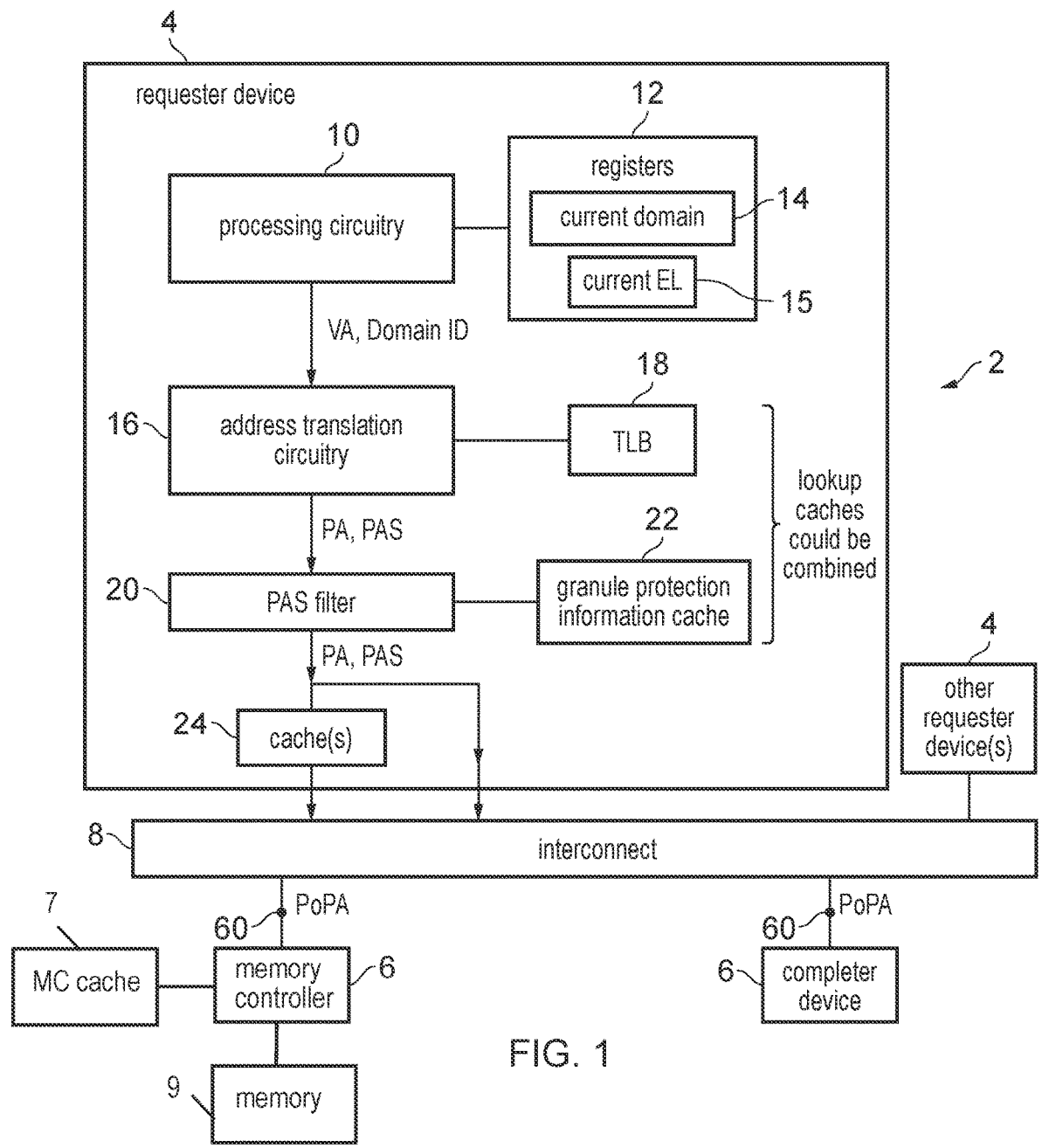
FIG. 1 illustrates an example of a data processing apparatus.

FIG. 1 schematically illustrates an example of a data processing system 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1. In this example, one of the completer devices 6 is a memory controller controlling access to memory 9. In this example, the completer device 6 has a memory controller cache 7 which can be used to cache some data read from memory 9, so that requests issued from the interconnect 8 can be processed faster if they hit in the memory controller cache 7 than if they miss and require an access to memory 9.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one of more stages of address translation based on page table data defined in page table structures stored in the memory system. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces associated with the physical address and outputs a physical address space (PAS) identifier identifying the selected physical address space. Selection of the PAS will be discussed in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information stored in a granule protection table structure stored within the memory system. The granule protection information may be cached within a granule protection information cache 22, similar to a caching of page table data in the TLB 18. While the granule protection information cache 22 is shown as a separate structure from the TLB 18 in the example of FIG. 1, in other examples these types of lookup caches could be combined into a single lookup cache structure so that a single lookup of an entry of the combined structure provides both the page table information and the granule protection information. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example of address translation circuitry 16 and PAS filter 20 provided within a requester 4, other types of requesters could use address translation functionality provided by a separate system memory management unit (SMMU) which is a separate component from the requester 4 itself. In that, the SMMU may be coupled to the interconnect and may act as the address translation circuitry and protection checking circuitry mentioned earlier, similar to the address translation circuitry 16 and PAS filter 20 shown in FIG. 1.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

Figure 2:
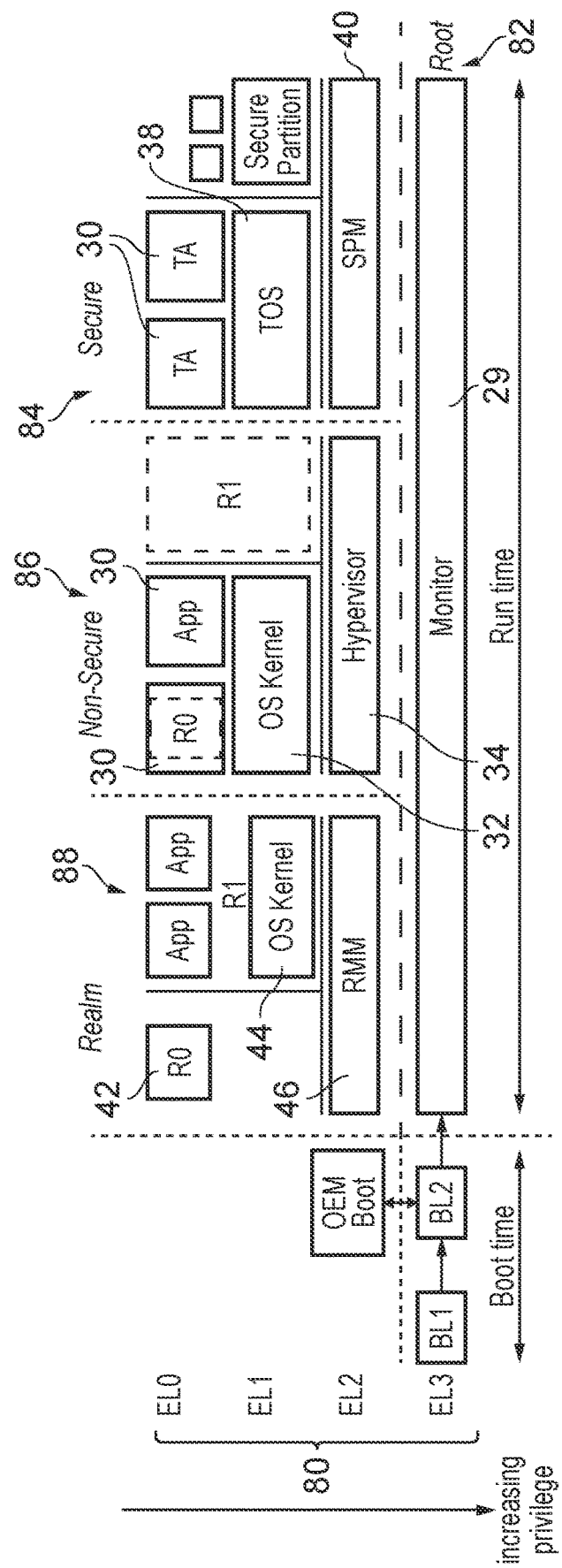
FIG. 2 illustrates a number of domains in which processing circuitry can operate.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labeled EL0, EL1, EL2 and EL3, where in this example EL3 refers to the exception level with the greatest level of privilege while EL0 refers to the exception level with the least privilege. It will be appreciated that other architectures could choose the opposite numbering so that the exception level with the highest number could be considered to have the lowest privilege. In this example the least privileged exception level EL0 is for application-level code, the next most privileged exception level EL1 is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 10 is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, EL1 or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain. However, once the system is booted, at runtime the processing circuitry 10 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at EL1 and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at ELL as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 2, an additional domain 88, called the realm domain, is provided which can be used by such user-introduced code to provide a secure computing environment orthogonal to any secure computing environment associated with components operating in the secure domain 24. In the realm domain, the software executed can include a number of realms, where each realm can be isolated from other realms by a realm management module (RMM) 46 operating at exception level EL2. The RMM 46 may control isolation between the respective realms 42, 44 executing the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and EL1. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only needs to trust the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code associated with realms 42, 44, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 2, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 3:
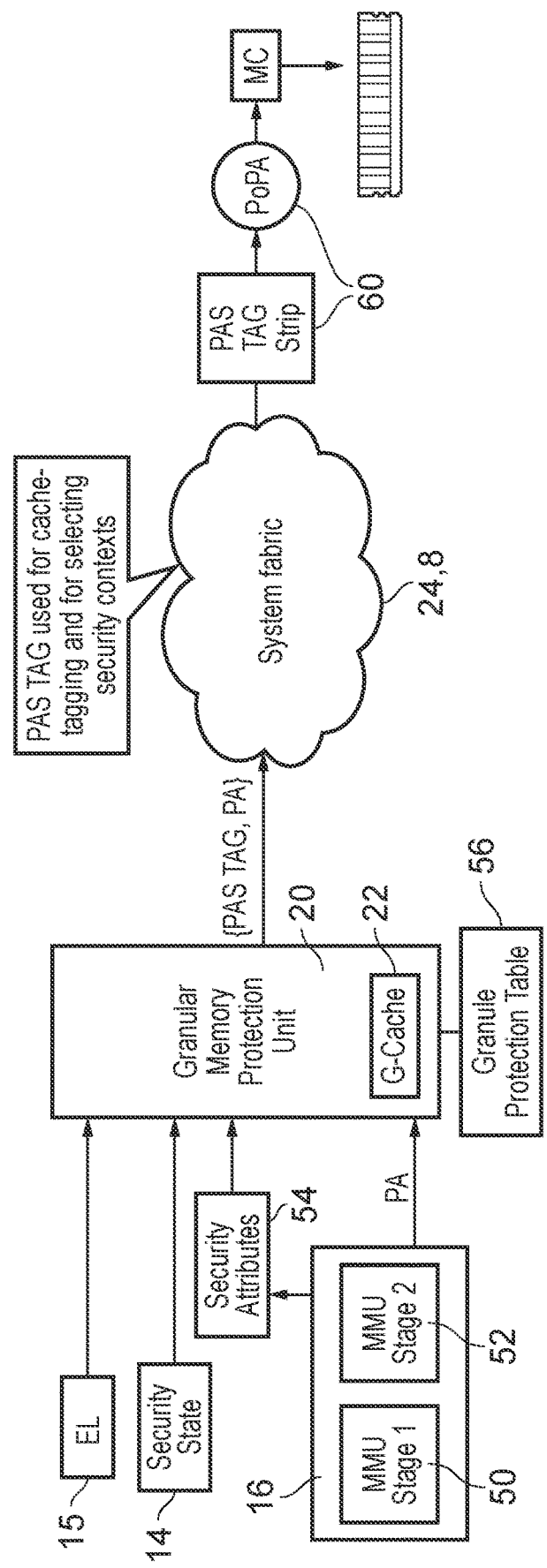
FIG. 3 illustrates an example of a processing system supporting granule protection lookups.

FIG. 3 schematically illustrates another example of a processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate addresses (when the translation is triggered by EL0 or EL1 code in an operating state where a further stage 2 translation by the stage 2 MMU 52 is required). The stage 2 MMU may translate intermediate addresses into physical addresses. The stage 1 MMU may be based on page tables controlled by an operating system for translations initiated from EL0 or EL1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM 40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. The physical address and PAS identifier may be looked up in a granule protection table 56 which provides the granule protection information described earlier. In this example the PAS filter 20 is shown as a granular memory protection unit (GMPU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS tag.

A given World is allowed access to a subset of Logical Physical Address Spaces. This is enforced by a hardware filter 20 that can be attached to the output of the Memory Management Unit 16.

A World defines the security attributes (the PAS tag) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

The hardware filter 20 checks the World ID and the Security Attributes against the Granule's GPI and decides if access can be granted or not, thus forming a Granular Memory Protection Unit (GMPU).

The GPT 56 can reside in on-chip SRAM or in off-chip DRAM, for example. If stored off-chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS TAG as they propagate throughout the system fabric 24, 8 until reaching a location defined as the Point of Physical Aliasing 60. This allows to locate the filter on the Master-side without diminishing the security guarantees comparing to Slave-side filtering. As the transaction propagates throughout the system, the PAS TAG can be used as an in-depth security mechanism for address isolation: e.g. caches can add the PAS TAG to the address tag in the cache, preventing accesses made to the same PA using the wrong PAS TAG from hitting in the cache and therefore improving side-channel resistance. The PAS TAG can also be used as context selector for a Protection Engine attached to the memory controller that encrypts data before it is written to external DRAM.

The Point of Physical Aliasing (PoPA) is a location in the system where the PAS TAG is stripped and the address changes back from a Logical Physical Address to a System Physical Address. The PoPA can be located below the caches, at the completer-side of the system where access to the physical DRAM is made (using encryption context resolved through the PAS TAG). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, a new instruction is supported by the System—"Data Clean and Invalidate to the Point of Physical Aliasing" which EL3 can submit before transitioning a page to the new PAS—this guarantees that any residual state associated with the previous PAS is flushed from any caches upstream of (closer to the requester-side than) the PoPA 60.

Another property that can be achieved by attaching the GMPU 20 to the master side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS TAG. As an example, the GPI can indicate that a physical Granule is can accessed only by "Realm World" 88 and "Secure World" 84 while being tagged with the PAS TAG of the Secure PAS 84.

An example of the above property is making fast changes in the visibility properties of a specific physical granule. Consider a case where each world is assigned with a private PAS that is only accessible to that World. For specific granules, the World can request to make them visible to the Non-Secure world at any point in time by changing their GPI from "exclusive" to "restrictive shared with Non-Secure world", and without changing the PAS association. This way, the visibility of that granule can be increased without requiring costly cache-maintenance or data copy operations.

FIG. 4 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 16, the physical address has a value within a certain numeric range 62 supported by the system, which is the same regardless of which physical address space is selected. However, in addition to the generation of the physical address, the address translation circuitry 16 may also select a particular physical address space (PAS) based on the current domain 14 and/or information in the page table entry used to derive the physical address. Alternatively, instead of the address translation circuitry 16 performing the selection of the PAS, the address translation circuitry (e.g. MMU) could output the physical address and the information derived from the page table entry (PTE) which is used for selection of the PAS, and then this information could be used by the PAS filter or GMPU 20 to select the PAS.

The selection of PAS for a given memory access request may be restricted depending on the current domain in which the processing circuitry 10 is operating when issuing the memory access request, according to rules defined in the following table:

| Current Domain | Non-Secure PAS | Secure PAS | Realm PAS | Root PAS |
| --- | --- | --- | --- | --- |
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 20 outputs a memory access request to the system fabric 24, 8 (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS identifier is treated as additional address bits alongside the physical address itself, so that depending on which PAS is selected the same physical address PAx can be mapped to a number of aliasing physical addresses 63 in the distinct physical address spaces 61. These aliasing physical addresses 63 all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

The system may include more than one PoPA 60 (e.g. as shown in FIG. 14 discussed below). At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS identifier may be stripped out from the addresses, and for the downstream components the addresses may simply be identified using the physical address value, without specifying the PAS. Alternatively, for some cases where some completer-side filtering of memory access request is desired, the PAS identifier could still be provided downstream of the PoPA 60, but may not be interpreted as part of the address so that the same physical addresses appearing in different physical address spaces 60 would be interpreted downstream of the PoPA as referring to the same memory system location, but the supplied PAS identifier can still be used for performing any completer-side security checks.

FIG. 5 illustrates how the system physical address space 64 can be divided, using the granule protection table 56, into chunks allocated for access within a particular architectural physical address space 61. The granule protection table (GPT) 56 defines which portions of the system physical address space 65 are allowed to be accessed from each architectural physical address space 61. For example the GPT 56 may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains. However, note that while a granule allocated to the secure PAS (for instance) cannot be accessed from within the root PAS, the root domain 82 is nevertheless able to access that granule of physical addresses by specifying in its page tables the PAS selection information for ensuring that virtual addresses associated with pages which map to that region of physical addressed memory are translated into a physical address in the secure PAS instead of the root PAS. Hence, the sharing of data across domains (to the extent permitted by the accessibility/ inaccessibility rules defined in the table described earlier) may be controlled at the point of selecting the PAS for a given memory access request.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 5 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 26 cannot access the realm PAS, then normally non-secure code could not see the data in region 70. However, if the realm temporarily wishes to share some of its data in its assigned regions of memory with the non-secure domain then it could request that the monitor code 29 operating in the root domain 82 updates the GPT 56 to indicate that region 70 is to be shared with the non-secure domain 86, and this may make region 70 also be accessible from the non-secure PAS as shown on the left hand side of FIG. 5, without needing to change which domain is the assigned domain for region 70. If the realm domain has designated a region of its address space as shared with the non-secure domain, then although the memory access requests targeting that region which are issued from the non-secure domain may initially specify the non-secure PAS, the PAS filter 20 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

FIG. 6 is a flow diagram showing how to determine the current domain of operation, which could be performed by the processing circuitry 10 or by address translation circuitry 16 or the PAS filter 20. At step 100 it is determined whether the current exception level 15 is EL3 and if so then at step 102 the current domain is determined to be the root domain 82. If the current exception level is not EL3, then at step 104 the current domain is determined to be one of the non-secure, secure and realm domains 86, 84, 88 as indicated by at least two domain indicating bits 14 within an EL3 control register of the processor (as the root domain is indicated by the current exception level being EL3, it may not be essential to have an encoding of the domain indicating bits 14 corresponding to the root domain, so at least one encoding of the domain indicating bits could be reserved for other purposes). The EL3 control register is writable when operating at EL3 and cannot be written from other exception levels EL2-EL0.

FIG. 7 shows an example of page table entry (PTE) formats which can be used for page table entries in the page table structures used by the address translation circuitry 16 for mapping virtual addresses to physical addresses, mapping virtual addresses to intermediate addresses or mapping intermediate addresses to physical addresses (depending on whether translation is being performed in an operating state where a stage 2 translation is required at all, and if stage 2 translation is required, whether the translation is a stage 1 translation or a stage 2 translation). In general, a given page table structure may be defined as a multi-level table structure which is implemented as a tree of page tables where a first level of the page table is identified based on a base address stored in a translation table base address register of the processor, and an index selecting a particular level 1 page table entry within the page table is derived from a subset of bits of the input address for which the translation lookup is being performed (the input address could be a virtual address for stage 1 translations of an intermediate address for stage 2 translations). The level 1 page table entry may be a "table descriptor" 110 which provides a pointer 112 to a next level page table, from which a further page table entry can then be selected based on a further subset of bits of the input address. Eventually, after one or more lookups to successive levels of page tables, a block or page descriptor PTE 114, 116, 118 may be identified which provides an output address 120 corresponding to the input address. The output address could be an intermediate address (for stage 1 translations performed in an operating state where further stage 2 translation is also performed) or a physical address (for stage 2 translations, or stage 1 translations when stage 2 is not needed).

To support the distinct physical address spaces described above, the page table entry formats may, in addition to the next level page table pointer 112 or output address 120, and any attributes 122 for controlling access to the corresponding block of memory, also specify some additional state for use in physical address space selection.

For a table descriptor 110, the PTEs used by any domain other than the non-secure domain 86 includes a non-secure table indicator 124 which indicates whether the next level page table is to be accessed from the non-secure physical address space or from the current domain's physical address space. This helps to facilitate more efficient management of page tables. Often the page table structures used by the root, realm or secure domains 24 may only need to define special page table entries for a portion of the virtual address space, and for other portions the same page table entries as used by the non-secure domain 26 could be used, so by providing the non-secure table indicator 124 this can allow higher levels of the page table structure to provide dedicated realm/secure table descriptors, while at a certain point of the page table tree, the root realm or secure domains could switch to using page table entries from the non-secure domain for those portions of the address space where higher security is not needed. Other page table descriptors in other parts of the tree of page tables could still be fetched from the relevant physical address space associated with the root, realm or the secure domain.

On the other hand, the block/page descriptors 114, 116, 118 may, depending on which domain they are associated with, include physical address space selection information 126. The non-secure block/page descriptors 118 used in the non-secure domain 86 do not include any PAS selection information because the non-secure domain is only able to access the non-secure PAS. However for the other domains the block/page descriptor 114, 116 includes PAS selection information 126 which is used to select which PAS to translate the input address into. For the root domain 22, EL3 page table entries may have PAS selection information 126 which includes at least 2 bits to indicate the PAS associated with any of the 4 domains 82, 84, 86, 88 as the selected PAS into which the corresponding physical address is to be translated. In contrast, for the realm and secure domains, the corresponding block/page descriptor 116 need only include one bit of PAS selection information 126 which, for the realm domain, selects between the realm and non-secure PASs, and for the secure domain selects between the secure and non-secure PASs. To improve efficiency of circuit implementation and avoid increasing the size of page table entries, for the realm and secure domains the block/page descriptor 116 may encode the PAS selection information 126 at the same position within the PTE, regardless of whether the current domain is realm or secure, so that the PAS selection bit 126 can be shared.

Hence, FIG. 8 is a flow diagram showing a method of selecting the PAS based on the current domain and the information 124, 126 from the block/page PTE used in generating the physical address for a given memory access request. The PAS selection could be performed by the address translation circuitry 16, or if the address translation circuitry forwards the PAS selection information 126 to the PAS filter 20, performed by a combination of address translation circuitry 16 and the PAS filter 20.

At step 130 in FIG. 8, the processing circuitry 10 issues a memory access request specifying a given virtual address (VA) as a target VA. At step 132 the address translation circuitry 16 looks up any page table entries (or cached information derived from such page table entries) in its TLB 18. If any required page table information is not available, address translation circuitry 16 initiates a page table walk to memory to fetch the required PTEs (potentially requiring a series of memory accesses to step through respective levels of the page table structure and/or multiple stages of address translation for obtaining mappings from a VA to an intermediate address (IPA) and then from an IPA to a PA). Note that any memory access requests issued by the address translation circuitry 16 in the page table walk operations may themselves be subject to address translation and PAS filtering, so the request received at step 130 could be a memory access request issued to request a page table entry from memory. Once the relevant page table information has been identified, the virtual address is translated into a physical address (possibly in two stages via an IPA). At step 134 the address translation circuitry 16 or the PAS filter 20 determines which domain is the current domain, using the approach shown in FIG. 6.

If the current domain is the non-secure domain then at step 136 the output PAS selected for this memory access request is the non-secure PAS.

If the current domain is the secure domain, then at step 138 the output PAS is selected based on the PAS selection information 126 which was included in the block/page descriptor PTE which provided the physical address, where the output PAS will be selected as either secure PAS or non-secure PAS.

If the current domain is the realm domain, then at step 140 the output PAS is selected based on the PAS selection information 126 included in the block/page descriptor PTE from which the physical address was derived, and in this case the output PAS is selected as either the realm PAS or the non-secure PAS.

If at step 134 the current domain is determined to be the root domain, then at step 142 the output PAS is selected based on the PAS selection information 126 in the root block/page descriptor PTE 114 from which the physical address was derived. In this case the output PAS is selected as any of the physical address spaces associated with the root, realm, secure and non-secure domains.

FIG. 9 illustrates an example of an entry of the GPT 56 for a given granule of physical addresses. The GPT entry 150 includes an assigned PAS identifier 152 identifying the PAS assigned to that granule of physical addresses and optionally includes further attributes 154, which could for example include the sharing attribute information 156 described earlier which enables the granule of physical addresses to become visible in one or more other PASs other than the assigned PAS. The setting of the sharing attribute information 156 could be performed by the root domain on request from code running in the domain associated with the assigned PAS. Also, the attributes could include a pass-through indicator field 158 which indicates whether or not the GPT checks (for determining whether the selected PAS for a memory access request is allowed to access that granule of physical addresses) should be performed on the requester-side by the PAS filter 20 or by completer-side filtering circuitry at the completer device side of the interconnect as will be discussed further below. If the pass-through indicator 158 has a first value, then the requester-side filtering checks may be required at the PAS filter 20 on the requester side, and if these fail then the memory access request may be blocked and a fault may be signaled. However, if the pass through indicator 158 has a second value, then the requester-side filtering checks based on the GPT 56 may not be needed for memory access requests specifying a physical address in the granule of physical addresses corresponding to that GPT entry 150, and in this case the memory access request may be passed through to a cache 24 or interconnect 8 regardless of checking whether the selected PAS is one of the allowed PASs allowed to access that granule of physical addresses, with any such PAS-filtering checks then being performed later at the completer-side instead.

FIG. 10 is a flow diagram showing the requester-side PAS filtering checks performed by the PAS filter 20 at the requester side of the interconnect 8. At step 170 the PAS filter 20 receives the memory access request associated with a physical address and an output PAS which may be selected as shown in FIG. 8 described earlier. As mentioned further below, while waiting for the subsequent steps 172-180 to be performed, it is possible to issue a read-if-hit-pre-PoPA request which may help data to be accessed faster in the case where the GPT check would be successful.

At step 172 the PAS filter 20 obtains the GPT entry corresponding to the specified PA, either from the granule protection information cache 22 if available, or by issuing a request to memory to fetch the required GPT entry from a table structure stored in memory. Once the GPT entry needed has been obtained, then at step 174 the PAS filter determines whether the output PAS selected for the memory access request is the same as the assigned PAS 152 defined in the GPT entry obtained at step 172. If so, then at step 176 the memory access request (specifying the PA and the output PAS) can be allowed to be passed to the cache 24 or the interconnect 8.

If the output PAS is not the assigned PAS, then at step 178 the PAS filter determines whether the output PAS is indicated in the sharing attribute information 156 from the obtained GPT entry as an allowed PAS allowed to access the granule of addresses corresponding to the specified PA. If so, then again at step 176 the memory access request is allowed to be passed to the cache 24 or the interconnect 8. The sharing attribute information could be encoded as a unique bit (or set of bits) within the GPT entry 150, or could be encoded as one or more encodings of a field of the GPT entry 150 for which other encodings of that same field may indicate other information. If step 178 determines that the sharing attribute indicates that the output PAS other than the assigned PAS is allowed to access the PA, then at step 176 the PAS specified in the memory access request passed to the cache 24 or the interconnect 8 is the assigned PAS, not the output PAS. The PAS filter 20 transforms the PAS specified by the memory access request to match the assigned PAS so that downstream memory system components treat it the same as requests issued specifying the assigned PAS.

If the output PAS is not indicated in the sharing attribute information 156 as being allowed to access the specified physical address (or alternatively, in an implementation which does not support the sharing attribute information 156, step 178 is skipped) then at step 180 it is determined whether the pass through indicator 158 in the obtained GPT entry for the target physical address identifies that the memory access request can be passed through to the cache 24 or the interconnect 8 regardless of the checks performed at the requester-side PAS filter 20, and if the pass-through indicator is specified then at step 176 and the memory access request is again allowed to proceed (specifying the output PAS as the PAS associated with the memory access request). Alternatively, if none of the checks at steps 174, 178 and 180 identify that the memory access request is allowed, then at step 182 the memory access request is blocked (for requests of a type other than the read-if-hit-pre-PoPA request described below—read-if-hit-pre-PoPA requests are allowed to be issued without waiting for a successful GPT check). Hence the memory access request other than the read-if-hit-pre-PoPA request is not passed to the cache 24 or to the interconnect 8, and a fault may be signaled which may trigger exception processing to deal with the fault.

While steps 174, 178, 180 are shown sequentially in FIG. 10, these steps could also be implemented in parallel or in a different order if desired. Also it would be appreciated that steps 178 and 180 are not essential and some implementations may not support use of the sharing attribute information 156 and/or the pass through indicator 158.

FIG. 11 summarises the operation of the address translation circuitry 16 and PAS filter. The PAS filtering 20 can be regarded as an additional stage 3 check performed after the stage 1 (and optionally stage 2) address translations performed by the address translation circuitry. Note also that the EL3 translations are based on page table entries which provide two bits of address based selection information (labeled NS,NSE in the example of FIG. 11), while a single bit of selection information "NS" is used to select the PAS in the other states. The security state indicated in FIG. 11 as input to the granule protection check refers to the Domain ID identifying the current domain of the processing element 4.

Read-If-Hit-Pre-PoPA Request

The granule protection check performed by the PAS filter (protection checking circuitry) 20 may be relatively slow because it may require a protection table walk to fetch in protection information from memory. If memory access requests to a given target PA and target PAS cannot be initiated until after the protection check is complete then this may incur an extra delay on all accesses to memory. The examples of FIG. 12 and FIG. 13 show processing of a read-if-hit-pre-PoPA request which can be supported by a memory interface protocol used by the requester 4, interconnect 8 and completer 6, so that this delay can be reduced.

The read-if-hit-pre-PoPA request causes one or more memory system component to provide a read-if-hit-pre-PoPA response which involves different outcomes depending on whether the target PA and target PAS of the request hit or miss in any pre-PoPA cache 24 which lies upstream of the PoPA 60 (closer to the requester device 4 than the PoPA 60).

FIG. 12 shows processing of the read-if-hit-pre-PoPA request when a cache hit is detected in a pre-PoPA cache 24. This cache could be within the requester device 4 as shown at FIG. 1, but could also be in another part of the memory system upstream of the PoPA 60, such as within the interconnect 8. For simplicity, FIG. 12 refers to a hit in a single pre-PoPA cache, but it will be appreciated that there could be multiple levels of pre-PoPA cache and the hit could be in any of those pre-PoPA cache levels.

As shown in FIG. 12, when the target PA for a required read memory access is ready from the address translation circuitry 16 for a given requester 4, the requester circuitry issues a read-if-hit-pre-PoPA request 190 specifying the target PA and target PAS obtained by the address translation circuitry 16 or PAS filter 20 (whichever is acting as PAS selection circuitry), without waiting for the granule protection table check (GPT check) described above to be completed by the PAS filter 20 (protection checking circuitry) for the target PA and target PAS. The read-if-hit-pre-PoPA request 190 is sent to at least one pre-PoPA memory system component, such as a cache 24 or interconnect 8, which checks whether a cache hit is detected in a pre-PoPA cache which treats aliasing PAs corresponding to the same memory system resource in different PASs as if they were actually separate addresses altogether. For example the cache lookup in a pre-PoPA cache 24 may be based on an address comparison of the target PA of the request against an address tag of a corresponding cache entry and a PAS identifier comparison between the target PAS identifier specified by the request and a corresponding PAS identifier tag associated with the corresponding cache entry.

If a cache hit is detected in a pre-PoPA cache 24 in response to the read-if-hit-pre-PoPA request 190, then a data response 191 is returned to the requester which provides the data read from the hit cache entry of the pre-PoPA cache 24. In that case the requester 4 can use the returned data for processing of subsequent instructions without waiting for the GPT check to be completed, for example the read data may be returned and stored in the registers 12 of the requester device 4. Once the GPT check is completed and determined as successful at point 192 of FIG. 12, there is no need to issue a subsequent read request as the data required has already been returned. Although not shown in FIG. 12, another option would be to halt any uncompleted parts of the GPT check when the data response 191 has been received in response to the read-if-hit-pre-PoPA request 190. For example if there are still some granule protection table walk access requests to be issued at the point when the data response 191 is received, any remaining granule protection table walk requests could be suppressed (alternatively, those walk requests could still be issued to allow the corresponding protection information to be cached in the granule protection information cache 22).

Also, although not shown in FIG. 12, if there are multiple levels of pre-PoPA cache and the request misses in a level 1 cache, there could also be some transfer of data between the pre-PoPA cache levels, to promote data hit in a level 2 or subsequent level of cache prior to the PoPA to a higher level of cache, and if needed, to evict data from a higher level of cache to make way for the promoted data. The linefill requests issued from a higher-level pre-PoPA cache to a lower-level pre-PoPA cache may also be issued as a read-if-hit-pre-PoPA request, to ensure that if the linefill request misses in the last-level pre-PoPA cache (the final level of cache prior to the PoPA) then data will not be brought into the pre-PoPA cache hierarchy from a memory system component beyond the PoPA 60.

FIG. 13 shows processing of the read-if-hit-pre-PoPA request 190 in cases where the pre-PoPA memory system component 24, 8 detects a miss in any levels of pre-PoPA cache 24 provided. When the cache miss is detected in the pre-PoPA cache, or if there are multiple levels of pre-PoPA cache, when a miss is detected in all of those pre-PoPA caches accessible to the requester 4 (this may exclude any private caches of other requesters which are not accessible to the requester 4 issuing the original read-if-hit-pre-PoPA request), then a no-data response 193 is returned to the requester 4, which indicates that the data for the requested PA and PAS cannot yet be returned safely.

Optionally, in addition to returning the no-data response 193, when the pre-PoPA cache miss is detected, the pre-PoPA memory system component 24, 8 could also issue a request 194 to a post-PoPA memory system component 6 (such as a memory controller, peripheral controller or another element) to request that a preparatory action is performed to prepare for a later read request to the same PA. This request for preparatory action 194 may trigger the post-PoPA memory system 6 to perform a preparatory operation (such as prefetching the data for the target PA into a post-PoPA cache 7 and/or performing activation or pre- charge operations in memory 9), which may make it more likely that a subsequent read request to the same PA may be processed faster than if the preparatory operation had not been performed. However the request for the preparatory action 194 is not allowed to cause data for the target PA to be promoted from a post-PoPA location to one of the pre-PoPA caches 24.

When the requester 4 determines, at point 192 of FIG. 13, that the GPT check for the target PA was successful, then the requester circuitry 4 then issues a standard read request 195 specifying the same target PA and target PAS as the earlier read-if-hit-pre-PoPA request 190, and this request will again miss in the pre-PoPA cache 24 and may then trigger a linefill request to a post-PoPA memory system component which may return the data, and so the requester circuitry 4 then receives a data response 191 (the same as the type of data response 191 received in the case of the cache hit shown in FIG. 12). As well as returning the data to the requester, the read request 195 may also cause the data for the target PA to be allocated into at least one pre-PoPA cache 24, as this is now safe because the GPT check has already been determined to be successful. The read request 195 issued in FIG. 13 may be a request type which is not allowed to be issued until after it has been verified that the GPT check for the specified target PA and target PAS has been successful. As the request for preparatory action 194 was already issued at the time of processing the read-if-hit-pre-PoPA request 190, then the read request 195 may be processed faster than if no request was issued at all until after the GPT check was determined to be successful, speeding up handling of the read request and hence improving performance.

However, other implementations may omit the request for preparatory action 194 and in this case performance can still be improved by providing support for the read-if-hit-pre-PoPA request, because, at least on the occasions when the request hits in a pre-PoPA cache as shown in FIG. 12, data can be returned earlier than if no read-if-hit-pre-PoPA request 190 was issued at all and all accesses to memory had to wait until after the GPT check was successful before issuing a read request 195.

In summary, In the context of a system which has caches before a point of physical aliasing (PoPA) tagged with realm information, and a memory controller (and potentially further caches) beyond a point of physical aliasing, it is desirable to prefetch memory locations before fully performing a granule protection check, so as to hide the cost of the additional stage of protection on a TLB walk. However, allocating such an entry that has elided a granule protection check into a cache can break security guarantees provided by the protection checking circuitry 20. The read-if-hit-pre-PoPA request provides a type of communications interface/coherency protocol request which acts as a cacheable read if it hits in a cache before the PoPA, and which returns a no-data response or acts as dataless prefetch request if it does not hit before the PoPA. This recognises that if the line is already in a cache before the PoPA with the same realm information as the new request, it is safe to move the line to another realm-tagged cache closer to the CPU or to return the line to the requester. It is however not safe to bring in the line from beyond the PoPA, as it could result in being tagged with the incorrect realm information. With a new request with semantics somewhere between a cacheable read and a memory controller/cache prefetch request, the latency can be minimised whilst not breaking any inherent security guarantees provided by the protection checks. The requester can send this new request type as soon as it has finished the translation, but before completing the granule protection check. The request is expected to look up cache hierarchies before the PoPA, and if it hits on a line with the same realm information as the new request, is expected to return the data to a cache closer to the requester, where it can then be allocated safely. If, however, the lookup misses in caches before the PoPA, the request can be turned into a prefetch request or other request for preparatory action that requests to prefetch the line into the closest cache beyond the PoPA or performs a pre-charge or activation operation, without returning any data to any cache before the PoPA. The requestor would receive a dataless response indicating no data can be returned safely. Once the requestor completes the granule protection check, a normal read transaction can be issued, which will then be able to retrieve the data with reduced latency as it is expected it will hit in a cache beyond the PoPA (e.g. the memory controller's prefetch buffers) or does not incur the delay associated with the pre-charge or activation operation. Alternatively additional buffering/caching could be provided closer to the PoPA.

FIG. 14 is a flow diagram illustrating operations performed by the requester circuitry 4 when initiating a read access to memory. At step 200 the address translation circuitry 16 of the requester device 4 performs address translation to translate the target VA to the target PA of the access. Also, PAS selection circuitry 16, 20 selects the target PAS to be used for the access, based on either the current domain 14 of operation in which processing is currently being performed, or information in an address translation entry corresponding to the target VA, or both the current domain and the information in the address translation entry. At step 202 the PAS filter 20 determines whether protection information for the specified target PA is already available in the protection information cache 22 (which could be a dedicated cache only for caching GPT entries or could be combined with a TLB 18 as discussed earlier). If the protection information is already available in the protection information cache 22 then at step 204 the protection check is performed using the cached protection information and at step 206 it is determined whether the protection check is successful. If so then at step 208 a read request 195 is issued by the requester circuitry to downstream memory system components, with the read request specifying the target PA obtained in the address translation and the target PAS obtained in the PAS selection. At step 210 the requester circuitry receives a read data response providing the requested data. The read data can be stored in registers 12 and made available for use as operands for subsequent instructions. On the other hand, if at step 206 the protection check is unsuccessful and the PAS filter 20 determines that the target PA is not allowed to be accessed within the target PAS (i.e. the target PAS is not an allowed address space for the target PA) then at step 212 the PAS filter 20 signals a fault and blocks the read request 195 from being issued to the downstream memory system components 24, 8, 6. The fault may cause an exception handler executing on the processing system to determine how to handle the faults, e.g. causing a system reset or causing a software routine to investigate why the request was made to the wrong address space for a given PA, disable execution of the thread which tried to access the wrong address space, or take another form of response action (the specific response taken may depend on the particular requirements of the applications running or the choices of a platform operator).

On the other hand, if at step 202 it is determined that the protection information for the target PA is not already available in a protection information cache 22 (either because no protection information cache 22 is provided at all, or because the request for the protection information for the target PA missed in a protection information cache 22) then at step 220 the requester circuitry 4 issues the read-if-hit-pre-PoPA request 190 to the downstream memory system components, with the request specifying the target PA and target PAS obtained at step 200. The read-if-hit-pre-PoPA request is issued without waiting for the protection check to be performed by the PAS filter 20. At step 222, a response to the read-if-hit-pre-PoPA request is received from the downstream memory system components. At step 224 the type of response is determined by the requester 4. If the type of response received is a data response then there is no need to issue the subsequent read request for the target PA and target PAS and so such a read request may be suppressed at step 226. If the received response was a no-data response 193 then the requester circuitry 4 awaits the outcome of the protection check.

Meanwhile, in parallel with the issuing of the read-if-hit-pre-PoPA request, in the case of the protection information for the target PA not being available in the protection information cache 22, the requester circuitry 4 also issues one or more protection table walk access requests at step 230, which are access requests to request that the protection information for the target PA is obtained from memory. Such protection table walk access requests specify a different PA from the target PA used for the read-if-hit-pre-PoPA request. The addresses to use for the protection table walk access requests may depend on a table base address maintained by the PAS filter 20 and on portions of the target PA of the read-if-hit-pre-PoPA request. The number of protection table walk accesses required may vary depending on the extent to which relevant information is present in the protection information cache, and on the way the protection table is defined and how many levels of the protection table are needed to be traversed to find the protection information for the target PA. For example the protection table could be a multi-level table and different portions of the target PA may be used to index into each level of the table with the base address maintained by the PAS filter 20 identifying a base address of a first level protection table and then base addresses of subsequent levels of protection tables being obtained based on the contents of a table entry read at an earlier level of the table. Different PAs may require traversal of different numbers of levels of the protection table.

Eventually, at step 232 the protection information corresponding to the target PA is received and at step 234 the PAS filter 20 performs the protection check using the received protection information. At this point, the PAS filter 20 may also allocate an entry into the granule protection information cache 22 (if provided) for the protection information associated with the target PA, so that future accesses to the same address may be performed faster. The protection check determines whether the target PAS selected at step 200 is allowed to be accessed for an access to the target PA (i.e. determines whether the target PAS is an allowed PAS for the target PA). At step 236 the PAS filter 20 determines whether the protection check is successful (the target PAS is an allowed PAS for the target PA) and if so then at step 240 a read request is issued by the requester device 4 specifying the target PA and target PAS. This read request is of the type 195 shown in FIG. 13 which will trigger a data response regardless of whether it misses or hits in a pre-PoPA cache 24. Step 240 is performed either if the protection check outcome has been determined as successful before any response has been received from the memory system in response to the read-if-hit-pre-PoPA request, or (more likely) if a no-data response is received in response to the read-if-hit-pre-PoPA request as shown in the arrow from step 224 to step 236 of FIG. 14. On the other hand, if at step 236 the protection check is determined to be unsuccessful, then again at step 212 a fault is signaled and a read request specifying the target PA and target PAS is blocked from being issued.

FIG. 15 shows in more detail an example of a pre-PoPA memory system component 300, which could, for example, be control circuit logic associated with a pre-PoPA cache 24 or control logic within the interconnect 8. The pre-PoPA memory system component 300 has a requester interface 302 for receiving requests from the requester device 4 and providing responses to the requester device 4, and a completer interface 308 for providing requests to a post-PoPA memory system component 6 and receiving, in return, a response to the requests. Control circuitry 304 handles the processing of incoming requests at the requester interface 302, issuing of requests via the completer interface 308, processing of responses received at the completer interface 308 and issuing of responses via the requester interface 302. Also, the control circuitry 304 controls lookups of a pre-PoPA cache 24.

FIG. 16 shows a flow diagram illustrating operations performed by the pre-PoPA memory system component 300. At step 310, the pre-PoPA memory system component receives a read-if-hit-pre-PoPA request 190 specifying a target PA and a target PAS. At step 312, the control circuitry 304 triggers a lookup of the target PA and target PAS in the pre-PoPA cache 24. If the lookup detects a cache hit in any pre-PoPA cache, so that there is an entry in a pre-PoPA cache 24 which is valid and which corresponds to both the target PA and the target PAS, then at step 314 the requester interface 302 of the pre-PoPA memory system component 300 is controlled by the control circuitry 304 to return a data response 191 which provides the data cached in the hit entry of the pre-PoPA cache 24. Although not shown in FIG. 16, it is possible that at step 314 there could be movement of data between different levels of pre-PoPA cache (e.g. on a level 1 cache miss but a level 2 cache hit, data could be promoted from the level 2 cache to the level 1 cache and this could cause data to be evicted from the level 1 cache to the level 2 cache, where both level 1 and level 2 caches are pre-PoPA caches).

On the other hand, if the lookup misses in the pre-PoPA cache (when there is no valid entry for which both the target PA and the target PAS correspond to the corresponding PA and PAS tags of the cache entry), then at step 316 a no-data response 191 is returned to the requester 4 via the requester interface 302. At step 318 the control circuitry 304 prevents any data for the target PA being allocated into the pre-PoPA cache 24 based on any linefill request issued to the post-PoPA memory system component 6. For example this could be enforced by preventing any such linefill requests being issued by the completer interface 308 to the post-PoPA memory system component. Also, in the cache miss scenario, at step 320 the control circuitry 304 controls the completer interface 308 to issues a request for the post-PoPA memory system component 6, 7, 9 to perform at least one preparatory action to prepare for processing of a later access request specifying the target PA. For example this request could cause data for the target PA to be prefetched into a post-PoPA cache 7 or may control the memory 9 to perform a pre-charge or activation operation for preparing a row of memory locations including a location corresponding to the target PA for future access, so that a future request specifying the same target PA can be processed with reduced latency. Step 320 is optional and can be omitted in some examples.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   requester circuitry to issue an access request for accessing a memory system, the access request specifying a target physical address and a target physical address space identifier identifying a target physical address space selected from among a plurality of physical address spaces; and
   memory system components to respond to the access request issued by the requester circuitry, the memory system components including:
      prior to a point of physical aliasing (PoPA), at least one pre-PoPA memory system component configured to treat aliasing physical addresses from different physical address spaces which actually correspond to the same memory system resource as if the aliasing physical addresses correspond to different memory system resources; and
      beyond the PoPA, at least one post-PoPA memory system component configured to treat the aliasing physical addresses as referring to the same memory system resource;
   in which:
   in response to a read-if-hit-pre-PoPA request issued by the requester circuitry specifying the target physical address and the target physical address space identifier, at least one of the memory system components is configured to provide a read-if-hit-pre-PoPA response action comprising:
      when the read-if-hit-pre-PoPA request hits in at least one pre-PoPA cache prior to the PoPA, providing a data response to the requester circuitry to return data cached in a hit entry of the at least one pre-PoPA cache corresponding to the target physical address and the target physical address space identifier; and
      when the read-if-hit-pre-PoPA request misses in the at least one pre-PoPA cache, providing a no-data response to the requester circuitry indicating that data for the target physical address will not be returned to the requester circuitry in response to the read-if-hit-pre-PoPA read request.

2. The apparatus according to claim 1, in which the read-if-hit-pre-PoPA response action comprises: when the read-if-hit-pre-PoPA request misses in the at least one pre-PoPA cache, preventing data for the target physical address being allocated into the at least one pre-PoPA cache based on a linefill request issued to at least one of said at least one post-PoPA memory system component in response to the read-if-hit-pre-PoPA request.

3. The apparatus according to claim 1, in which the read-if-hit-pre-PoPA response action comprises: when the read-if-hit-pre-PoPA request misses in the at least one pre-PoPA cache, issuing a request for at least one of said at least one post-PoPA memory system component to perform at least one preparatory operation to prepare for processing of a later access request specifying the target physical address.

4. The apparatus according to claim 3, in which the at least one preparatory operation comprises at least one of:
prefetching data associated with the target physical address into a post-PoPA cache;
performing a pre-charge or activation operation to prepare a memory location associated with the target physical address for access.

5. The apparatus according to claim 1, comprising protection checking circuitry to perform a protection check to determine whether the target physical address for a given access request is allowed to be accessed within the target physical address space, based on a lookup of protection information corresponding to the target physical address, the protection information indicative of at least one allowed physical address space from which the target physical address is allowed to be accessed.

6. The apparatus according to claim 5, in which, when the protection information corresponding to the target physical address is not already available in a protection information cache, the protection checking circuitry is configured to issue one or more protection table walk access requests to the memory system components to perform a protection table walk to obtain the protection information from a protection table indexed by the target physical address.

7. The apparatus according to claim 5, in which the requester circuitry is configured to issue the read-if-hit-pre-PoPA request prior to completing the protection check for the target physical address and the target physical address space.

8. The apparatus according to claim 7, in which in response to the protection check determining that the target physical address is allowed to be accessed within the target physical address space when the no-data response was received in response to the read-if-hit-pre-PoPA request, the requester circuitry is configured to issue a read request specifying the target physical address and the target physical address space; and
in response to the read request, at least one of the memory system components is configured to provide a data response to return data associated with the target physical address to the requester circuitry even when the read request misses in the at least one pre-PoPA cache.

9. The apparatus according to claim 8, in which in response to the read request, the memory system components are allowed to cause data associated with the target physical address to be allocated into the at least one pre-PoPA cache based on a linefill request issued to at least one of said at least one post-PoPA memory system component.

10. The apparatus according to claim 8, in which the requester circuitry is configured to prevent issuing of the read request when the protection check determines that the target physical address is not allowed to be accessed within the target physical address space.

11. The apparatus according to claim 5, in which the protection circuitry is configured to signal a fault when the protection check determines that the target physical address is not allowed to be accessed within the target physical address space.

12. The apparatus according to claim 1, in which:
the at least one pre-PoPA cache is configured to detect a cache miss when no valid entry of the at least one pre-PoPA cache corresponds to both the target physical address and the target physical address space identifier, even if a valid entry of the at least one pre-PoPA cache corresponds to the target physical address and a different physical address space identifier to the target physical address space identifier.

13. The apparatus according to claim 1, comprising address translation circuitry to obtain the target physical address by translating a target virtual address, based on address translation information corresponding to the target virtual address.

14. The apparatus according to claim 13, comprising physical address space selection circuitry to select the target physical address space identifier corresponding to the target physical address based on at least one of:
a current domain of operation of the requester circuitry; and
information specified in the address translation information corresponding to the target virtual address.

15. A method comprising:
issuing, from requesting circuitry, an access request for accessing a memory system comprising memory system components, the access request specifying a target physical address and a target physical address space identifier identifying a target physical address space selected from among a plurality of physical address spaces; and
responding to the access request issued by the requester circuitry using the memory system components, the memory system components including:
prior to a point of physical aliasing (PoPA), at least one pre-PoPA memory system component configured to treat aliasing physical addresses from different physical address spaces which actually correspond to the same memory system resource as if the aliasing physical addresses correspond to different memory system resources; and
beyond the PoPA, at least one post-PoPA memory system component configured to treat the aliasing physical addresses as referring to the same memory system resource;
in which:
in response to a read-if-hit-pre-PoPA request issued by the requester circuitry specifying the target physical address and the target physical address space identifier, at least one of the memory system components provides a read-if-hit-pre-PoPA response action comprising:
when the read-if-hit-pre-PoPA request hits in at least one pre-PoPA cache prior to the PoPA, providing a data response to the requester circuitry to return data cached in a hit entry of the at least one pre-PoPA cache corresponding to the target physical address and the target physical address space identifier; and
when the read-if-hit-pre-PoPA request misses in the at least one pre-PoPA cache, providing a no-data response to the requester circuitry indicating that data for the target physical address will not be returned to the requester circuitry in response to the read-if-hit-pre-PoPA request.

16. A memory system component comprising:
a requester interface to receive an access request from requester circuitry, the access request specifying a target physical address and a target physical address space identifier identifying a target physical address space selected from among a plurality of physical address spaces; and
control circuitry to detect whether a hit or miss is detected in a lookup of at least one pre-PoPA cache prior to a point of physical aliasing (PoPA), where the at least one pre-PoPA cache is configured to treat aliasing physical addresses from different physical address spaces which actually correspond to the same memory system resource as if the aliasing physical addresses correspond to different memory system resources, and the PoPA is a point beyond which at least one post-PoPA memory system component is configured to treat the aliasing physical addresses as referring to the same memory system resource; in which:
in response to a read-if-hit-pre-PoPA request issued by the requester circuitry specifying the target physical address and the target physical address space identifier, the control circuitry is configured to provide a read-if-hit-pre-PoPA response action comprising:
when the lookup of the at least one pre-PoPA cache detects a hit, controlling the requester interface to provide a data response to the requester circuitry to return data cached in a hit entry of the at least one pre-PoPA cache corresponding to the target physical address and the target physical address space identifier; and
when the lookup of the at least one pre-PoPA cache detects a miss, controlling the requester interface to provide a no-data response to the requester circuitry indicating that data for the target physical address will not be returned to the requester circuitry in response to the read-if-hit-pre-PoPA request.

17. The memory system component according to claim 16, in which the read-if-hit-pre-PoPA response action comprises: when the lookup of the at least one pre-PoPA cache detects a miss, preventing data for the target physical address being allocated into the at least one pre-PoPA cache based on a linefill request issued to at least one of said at least one post-PoPA memory system component in response to the read-if-hit-pre-PoPA request.

18. The memory system component according to claim 16, in which the read-if-hit-pre-PoPA response action comprises: when the lookup of the at least one pre-PoPA cache detects a miss and the at least one-PoPA memory system component comprises at least one post-PoPA cache, issuing a request for at least one of said at least one post-PoPA memory system component to perform at least one preparatory operation to prepare for processing of a later access request specifying the target physical address.

19. The memory system component according to claim 18, in which the at least one preparatory operation comprises at least one of:
prefetching data associated with the target physical address into a post-PoPA cache;
performing a pre-charge or activation operation to prepare a memory location associated with the target physical address for access.

* * * * *